United States Patent
Sekiya

(10) Patent No.: US 6,338,545 B1
(45) Date of Patent: Jan. 15, 2002

(54) LIQUID JET RECORDING APPARATUS USING A FINE PARTICLE DISPERSION RECORDING COMPOSITION

(75) Inventor: Takuro Sekiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/360,996

(22) Filed: Jul. 8, 1999

(30) Foreign Application Priority Data

| Jul. 21, 1998 | (JP) | 10-205195 |
| Nov. 18, 1998 | (JP) | 10-327734 |
| Apr. 12, 1999 | (JP) | 11-104494 |

(51) Int. Cl.$^7$ ................................. B41J 2/14
(52) U.S. Cl. ..................... 347/47; 347/45; 347/100
(58) Field of Search ........................ 347/47, 45, 100, 347/96

(56) References Cited

U.S. PATENT DOCUMENTS

| 3,060,429 A | 10/1962 | Winston |
| 3,298,030 A | 1/1967 | Lewis et al. |
| 3,416,153 A | 12/1968 | Hertz et al. |
| 3,596,275 A | 7/1971 | Sweet |
| 3,747,120 A | 7/1973 | Stemme |
| 4,223,320 A | * 9/1980 | Paranjpe et al. ............... 347/75 |
| 5,407,136 A | * 4/1995 | West et al. ..................... 347/47 |
| 5,549,740 A | * 8/1996 | Takahashi et al. ........... 347/100 |
| 5,739,833 A | * 4/1998 | Yamazaki et al. ........... 347/100 |
| 5,825,386 A | * 10/1998 | Ohashi ......................... 347/71 |
| 6,084,619 A | * 7/2000 | Takemoto et al. ........... 347/100 |

FOREIGN PATENT DOCUMENTS

| JP | 56-9429 | 3/1981 |
| JP | 2255875 | 10/1990 |
| JP | 4-57859 | 2/1992 |
| JP | 4-57860 | 2/1992 |

\* cited by examiner

Primary Examiner—John E. Barlow, Jr.
Assistant Examiner—Manich Shah
(74) Attorney, Agent, or Firm—Cooper & Dunham LLP

(57) ABSTRACT

In an apparatus producing a high-quality and high-resolution image having high water and light resistances with an orifice having a diameter less than $\phi 25$ $\mu$m (less than 500 $\mu$m$^2$ in terms of cross-sectional area of the orifice) by use of a fine particle dispersion recording composition, nozzle clogging can be prevented. A recording is accomplished by a liquid jet recording apparatus for ejecting a recording composition including dispersed fine particles from a small orifice toward a receiving medium, wherein a size $D_p$ of the fine particles and a diameter $D_o$ of the small orifice are determined by a relationship $0.001 \leq D_p/D_o \leq 0.01$.

25 Claims, 11 Drawing Sheets

LIQUID JET RECORDING APPARATUS USING A FINE PARTICLE DISPERSION RECORDING COMPOSITION

BACKGROUND OF THE INVENTION

1. Field of the Invention

The present invention generally relates to a liquid jet recording apparatus and, more particularly, to a liquid jet recording apparatus using a recording composition where fine particles are dispersed.

2. Description of the Related Art

Recently much attention has been paid to a non-impact recording technology because the noise caused by its recording operation can be reduced to an almost negligible degree. Among this technology, an ink-jet recording method, which is capable of high-speed recording, is a promising candidate, and its operation can be performed using a plain paper without a special fixing process. In this-field, various approaches for practical use have been proposed including those already commercialized and others still in the development stage.

Such an ink-jet recording method, where droplets of a recording composition, usually called ink, produces a recording image on a record receiving member by flying droplets of a recording composition directly onto a surface of the record receiving member. This recording system can be classified into several processes according to the methods of generating the droplets and controlling the flight direction of the droplets.

In the prior art, for example in U.S. Pat. No. 3,060,429, it is known that a Teletype process, which is an electrostatic attraction type process, provides a generation of droplets of a recording composition by electrostatic pull, and the resulting droplets can be controlled by an electrical field according to recording signals to place the droplets on a surface of a record receiving member selectively to achieve a recording.

U.S. Pat. Nos. 3,596,275 and 3,298,030 describe a Sweet process which is a continuous stream and charge-controlled type process, in which droplets can be generated by a continuous vibration method, with an electrostatically controlled charge, and then the droplets pass between a pair of electrostatic deflecting electrodes with a uniform electric field to deposit the droplets on a surface of a record receiving member, thus producing a recording image.

As another method, for example, U.S. Pat. No. 3,416,153 teaches a Hertz process, in which an electric voltage is applied between a nozzle and a ring-shaped electrode near the front of the nozzle to generate a mist of liquid droplets by continuous vibration to obtain a recording image on a recording member. That is to say, in this process a strength of the electric field applied between the nozzle and the electrode can be modulated in accordance with recording signals to control a mist state of the droplets, thereby creating a gradation in the recording image.

Moreover, as another method, for example, U.S. Pat. No. 3,747,120 discloses a Stemme process. A principle of this process is fundamentally different from that used in the above three processes. That is, while all the above three processes employ electrical control of the droplets emitted from the nozzle during the flight from the nozzle to place the droplets corresponding to the recording signals on the surface of the record receiving member selectively, in this Stemme process the droplets can be emitted directly from the nozzle to a receiver only when they are required for recording. In other words, in the Stemme process, electrical recording signals can be applied to a piezo vibrating element which is attached to a recording head with the nozzle, in which the recording liquid can be emitted, to convert the electrical signals to a mechanical vibration of the piezo element. The droplets can be emitted from the nozzle according to the mechanical vibration, thereby forming a recording image on the record receiving member. This process is called a drop-on-demand type.

Furthermore, Japanese Patent Publication 56-9429 discloses still another process previously proposed by the present applicants. This process also employs the so-called drop-on-demand method which emits and flies droplets of a recording composition from the nozzle according to recording signals. This process is a so-called bubble-jet method where ink droplets can be ejected from the nozzle by an action of a vapor bubble in an ink generated by heating the ink in an ink chamber.

As noted above, although the ink-jet recording method has various processes on the basis of the principle, there is a common point between these processes, in which common point droplets of a recording composition, generally called ink, are emitted to form the recording image on the record receiving member. Such ink is generally an aqueous recording liquid wherein a water-soluble dye is dissolved. Recently, however, due to a strong need for water and light resistances in recorded images, it has been anticipated that a pigment-based ink with a strong image durability will be used as a color agent for the recording composition of ink-jet recording ink. For example, aqueous pigment-based inks for ink-jet recording ink which meet a basic demand for recording quality, ejection characteristics, storage stability, penetration and absorption properties into a recording medium and the like, are described in Japanese Laid-Open Publications 2-255875, 4-57859, and 4-57860. However, the pigment-based inks described in the above publications have an inherent disadvantage of particle dispersion instability in a liquid medium, unlike the dye which can be dissolved in the liquid medium stably, thus creating problems, such as pigment aggregation, sedimentation, separation in the recording liquid and thereby nozzle clogging which plague ink-jet recording technology.

On the other hand, to obtain a high-quality and high-resolution ink-jet recording image, a smaller nozzle has been required for-this purpose, although a conventional nozzle diameter from $\phi 33$–$\phi 34$ $\mu$m (about 900 $\mu m^2$ in terms of cross-sectional area of a nozzle orifice) to $\phi 50$–$\phi 51$ $\mu$m (about 2000 $\mu m^2$ in terms of cross-sectional area of the nozzle orifice) in a recording head has been used. In this case, when the recording composition wherein the aqueous dye can be dissolved is used as an ink-jet ink, the problem of nozzle clogging is resolved because the dye is dissolved completely in the liquid medium. For the pigment-based ink, however, there has been a serious problem of nozzle clogging in a recording operation with the smaller nozzle having, for example, a nozzle diameter of less than $\phi 25$ $\mu$m.

Furthermore, the above recording composition including the pigments can cause an ink passageway of the ink-Jet recording head to be cut away and damaged due to a long time operation, in the same way that a mountain can be eroded by river water including small pebbles. Although it is not a problem when only the ink passageway is subjected to slight damage and wear, damage and wear of the orifice of the nozzle lead to serious degradation of ink drop ejection characteristics.

Especially, because a smaller ink drop volume is required to achieve a high-quality and high-resolution ink-jet recording image in the ink-jet recording method, the nozzle diameter of the recording head has become increasingly small. For example, the nozzle diameter has become less than φ25 μm, or less than 500 μm² in terms of cross-sectional area of the nozzle orifice, although the conventional diameter from φ33~φ34 μm (about 900 μm² in terms of cross-sectional area of the nozzle orifice) to φ50~φ51 μm (about 2000 μm² in terms of cross-sectional area of the nozzle orifice) of the recording head nozzle has been successfully used. In the conventional case, since the previous relatively large nozzle is subjected to little damage and wear, there is little influence on ink droplet ejection characteristics, such as ejection stability, ink weight uniformity and the like, thus introducing no problem. However in the case of the smaller nozzle having, for example, a diameter less than φ25 μm, even a little damage and wear have significant influences on ink droplet ejection characteristics, thereby introducing a serious problem.

SUMMARY OF THE INVENTION

It is an object of the present invention to provide a liquid jet recording apparatus eliminating the nozzle clogging problem, in which a recording composition formed by dispersing fine particles in the liquid is ejected from a small orifice of a nozzle to place ink droplets on a receiver medium, thus producing a recording image. Above all, the present apparatus is to provide no nozzle clogging problem, yet produce an excellent high-resolution recording, having water and light resistances for recorded images using a nozzle diameter of less than φ25 μm (less than 500 μm² in terms of cross-sectional area of a nozzle orifice).

To accomplish the above objects, there is provided, in accordance with the present invention, a liquid jet recording apparatus wherein a recording composition satisfies a relationship $0.001 \leq D_p/D_o \leq 0.01$, where $D_p$ is a size of a fine particle, and $D_o$ is a diameter of a fine nozzle orifice, on the condition that the diameter of the nozzle orifice is less than φ25 μm. According to the present invention, a high-quality recording with high water and light resistances can be realized and a reliability of an ink-jet recording apparatus can be improved with the absence of nozzle clogging in the present recording apparatus.

The problem of nozzle clogging in the present apparatus can be eliminated completely under the conditions that a content of the fine particles in the recording composition is in the range of 2 to 10% by weight based on the total amount of the recording composition, and that a solid content of the recording composition including the fine particles is less than 15% by weight, when the diameter of the nozzle orifice in the present apparatus is less than φ25 μm. According to the present invention, a sufficient ink density for practical use and a stable dispersion of fine particles can be obtained because of optimization of the content of the fine particles in the recording composition and the solid content of the ink, and a recorded image with high water and light resistances can be realized with the absence of nozzle clogging in the present recording apparatus.

The problem of nozzle clogging in the present apparatus can be prevented completely under the requirement that $D_p/t \leq 0.01$, wherein the diameter of the nozzle orifice is less than φ25 μm, and t is a length of the orifice having a uniform cross-sectional area at an outlet portion in the nozzle. According to the present invention, a high-quality and high-resolution recording image can be obtained with the absence of nozzle clogging, thereby improving a reliability of the apparatus.

A high-quality printed image by use of the present apparatus can be accomplished by maintaining a distance of less than 100t from the orifice of the nozzle to a receiving medium and ejecting ink droplets in a direction of gravity.

Damage and wear of the nozzle formed of a resin in the present apparatus can be prevented by making a hardness of the resin within a range of Rockwell M65 to M120. According to the present invention, a stable high-quality recording can be realized with no deterioration of the ink ejection characteristic due to nozzle damage and wear.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

First of all, although there are various processes in the ink-jet recording method as mentioned above, a structure and a principle of the ink-jet recording method used in the present invention will be described in the following. Herein, as a representative example, a bubble-jet recording method will be described, but rather than being limited to this, the present invention can be applied to all ink-jet recording methods. Since the bubble-jet recording method, which produces a vapor bubble by heating ink, exposes the ink to severe conditions during its operation, that is, there is an ink heat cycle in this method, there more likely exist technological problems producing nozzle clogging in this method than in other ink-jet recording methods. Such technological problems include deterioration of ink, promotion of a chemical reaction of the ink, and dispersion instability of pigments in the recording composition. The present invention can be preferably applied to the bubble-jet recording method with exposure to such severe conditions.

Figure 1A:
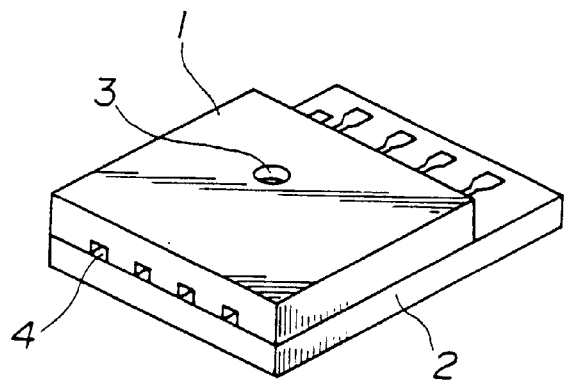
FIGS. 1A through 1D show an embodiment of a bubble-jet type recording head according to the present invention.
Figure 1B:
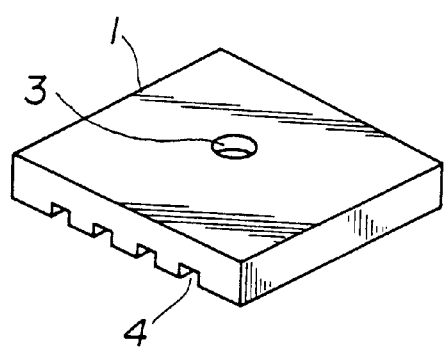
Figure 1C:
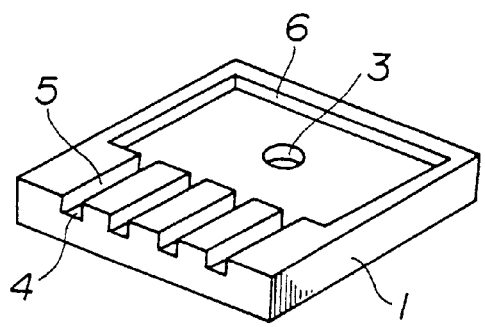
Figure 1D:
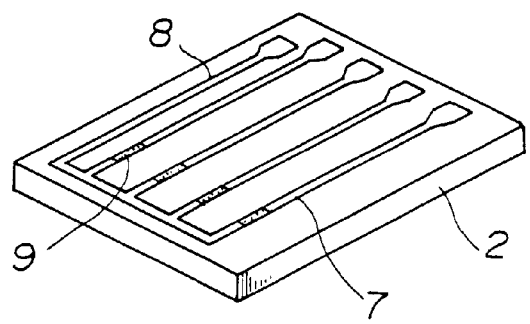

FIGS. 1A through 1D show an embodiment of a bubble-jet type recording head according to the present invention. FIG. 1A shows a perspective view of the recording head, FIG. 1B shows a perspective view of a cover substrate which is a part of the recording head, FIG. 1C shows a perspective view of the cover substrate as seen from a back side, and FIG. 1D shows a perspective view of a heating element substrate. As shown in FIGS. 1A through 1D, the recording head includes the cover substrate 1, the heating element substrate 2, an inlet 3 of recording liquid, a nozzle 4, a passageway 5, a region to form a liquid chamber 6, a separate (independent) controlling electrode 7, a common electrode 8, and a heating element 9.

The cover substrate 1 can be made with the passageway 5 and the liquid chamber 6 by means of an etching method or the like on a glass substrate or a metallic substrate. The most preferable method for making the cover substrate 1 is a plastic molding. Although a cost of manufacturing an initial mold in this method is very expensive, the cover substrate can be subsequently produced on a large scale, thus reducing the manufacturing cost per one article. In this case, a stable ink drop ejection can be accomplished without damage and wear of a part of the nozzle 4 by selecting a hardness of the plastic as described later.

Figure 2A:
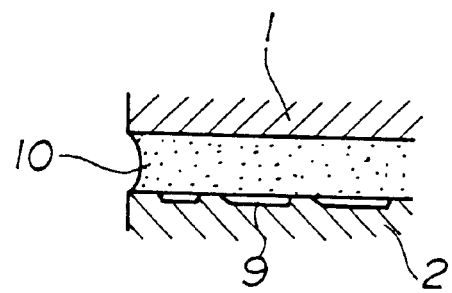
FIGS. 2A through 2G show a principle for ink drop ejection of an ink-jet recording method.
Figure 2B:
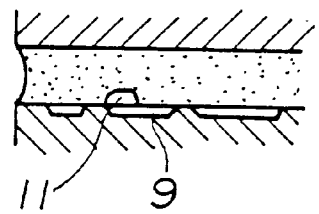
Figure 2C:
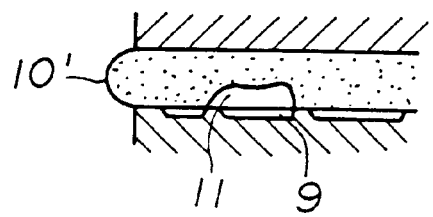
Figure 2D:
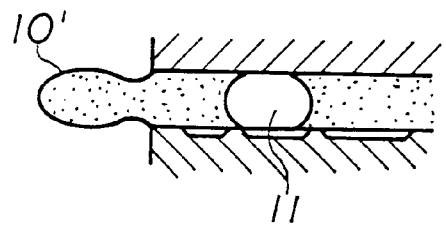
Figure 2E:
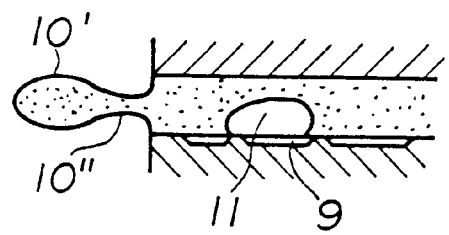
Figure 2F:
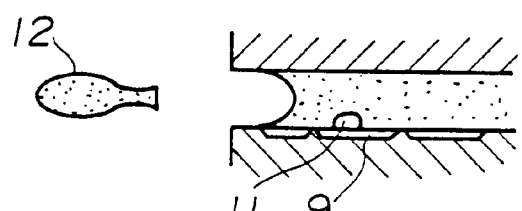
Figure 2G:
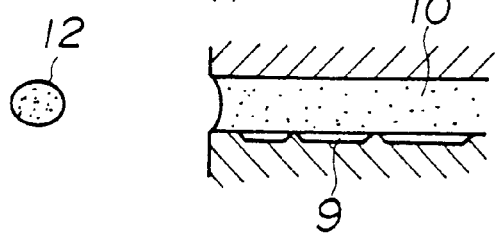

FIGS. 2A through 2G illustrate a principle for ink drop ejection of the ink-jet recording method. FIG. 2A shows an equilibrium state between a surface tension of an ink 10 and an external pressure at a nozzle plane. FIG. 2B shows a microscopic vapor bubble 11 in the ink 10 generated by heating the ink 10. The heating element 9 is heated to increase its surface temperature rapidly, and heating is continued until a boiling phenomenon occurs in the ink 10 around the heating element 9. FIG. 2C shows an expanded state of the vapor bubble 11 which is formed by heating the ink 10 across all surfaces of the heating element 9 rapidly, so that the ink 10 nearby the heating element 9 is vaporized instantaneously to give a boiling bubble. At this time, a pressure of the ink 10 in the nozzle is increased by the expansion of the vapor bubble to give a non-equilibrium state between the surface tension of the ink 10 and the external pressure at the nozzle plane, and an ink column 10' then begins to expand outward from the nozzle. FIG. 2D shows the expanded state of the vapor bubble 11 at maximum, whereby emission of ink occurs from the nozzle, which emission corresponds to the volume of the vapor bubble 11. Since an electric current is not supplied to the heating element 9 at this time, the surface temperature of the heating element 9 begins to decrease. An occurrence of the maximum vapor bubble volume may be delayed from a time of electrical pulse application. FIG. 2E illustrates a state showing the vapor bubble 11 beginning to contract from cooling the vapor bubble 11 with surrounding ink 10. While a leading portion of the ink column 10' proceeds at an initial emission velocity, at a tail portion of the ink column 10', a constricted part 10" is formed with a reverse flow into the ink 10 due to a decreased pressure inside the nozzle along with the vapor bubble 11 contraction. FIG. 2F illustrates a state showing that the surface of the heating element 9 is cooled rapidly because the contraction of the vapor bubble 11 is continued and thus the surface of the heating element 9 is covered by the ink 10 again. Since the external pressure is higher than the inner pressure in the nozzle, ink meniscus is moved into the nozzle. The leading portion of the ink column becomes a droplet 12 and flies at a speed from 8 to 13 m/sec toward a receiver. FIG. 2G shows that the nozzle is refilled with the ink 10 by capillary action and the vapor bubble 11 collapses completely during a process back to the initial state as shown in FIG. 2A.

Figure 3A:
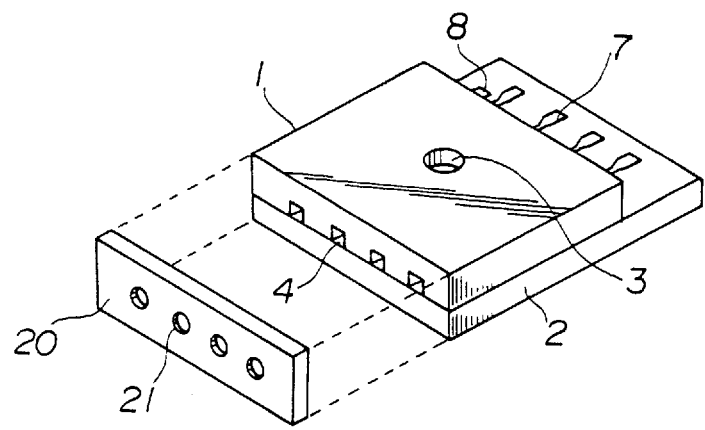
FIGS. 3A and 3B show another embodiment of a bubble-jet type recording head according to the present invention.
Figure 3B:
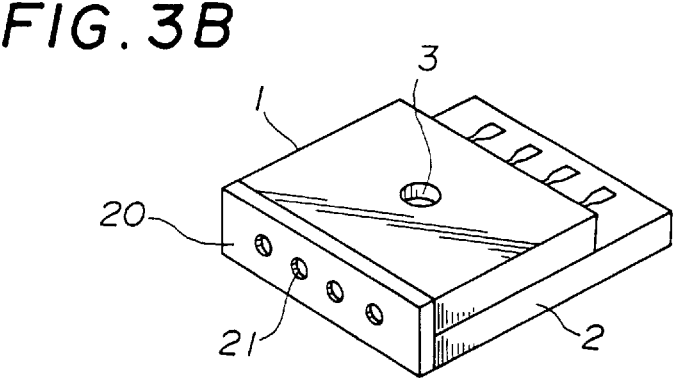

FIGS. 3A and 3B show another recording head having an additional nozzle plate 20 attached at a tip portion of the passageway, unlike the recording head as shown in FIG. 1A. FIG. 3A shows the recording head before attachment of the nozzle plate 20, but FIG. 3B shows the recording head after the nozzle plate 20 is mounted. The nozzle plate 20 can be formed of a resin (plastic) film, in which a orifice 21 of the nozzle plate 20 can be made by ablation with an excimer laser, or the orifice 21 can be made by a metal etching method, an electroforming method, a micropunching method, or the like. A hardness of materials must be selected to meet a required property as described later.

The foregoing discussion is of a general structure and principle of a bubble jet-type recording head by use of thermal technology. As noted above, but not limited to this, the present invention can be applied to all ink-jet recording methods.

The present invention employs a recording composition, such as recording liquid including pigment, generally called ink, which has excellent water and light resistances, the pigment be used as a color agent in such ink-jet recording methods. However, when the pigment is used as color agent in the recording composition, stability of the pigment in the recording composition may be deteriorated due to inadequate dispersion, unlike a dye which dissolves completely in the recording composition, thus leading to problems, such as pigment aggregation, sedimentation, separation in the recording ink and nozzle clogging. Especially, nozzle clogging becomes a serious problem because ink can not be ejected. To overcome the above problems, careful consideration is given to materials for the ink, a structure of the nozzle, pigment diameter and pigment content in the recording composition in the present invention. The pigment-based ink is used in the present invention. That is, the color agent is not the dye dissolved in water and the like, but a fine particle like pigment dispersed in the above solvent.

Furthermore, since the pigment is like an abrasive particle dispersed in the liquid medium, the ink passageway of the recording head may be subjected to damage and wear when a tremendous amount of ink comprising the pigment is used, thereby leading to flaws and wear in the nozzle affecting the ink drop ejection characteristics. To resolve these problems, special efforts have been directed toward optimizing a hardness of materials which constitute a nozzle component, and ink flow and pigment diameter against the nozzle size.

As a most preferable black pigment ink, for example, a black pigment, which has a neutral or basic pH, is subjected to dispersion treatment by use of a water-soluble polymer comprising at least acrylate monomer having a salt of tertiary amine or a quaternary ammonium group, or acrylamide monomer. Similarly, other color pigments, such as yellow, magenta, and cyan, are also subjected to dispersion treatment by use of an anionic polymer dispersing agent having a carboxyl group or a sulfonic acid group as a water-soluble group.

Herein, a pH value of the black pigment is generally determined when this pigment is dispersed in pure water in a similar way to a property measurement method for carbon black. When the record receiving member is a plain paper, an interfacial tension against the plain paper for black ink is higher than that for other color inks. Moreover, it is preferred that a penetration rate into the plain paper for black ink is slower than that for other color inks. A high-quality image with good adhesion, good color density, and little boundary bleeding between black and other colors can be obtained when multicolor recording is performed on the plain paper by the above inks. In addition, a vivid projection image can be obtained when multicolor recording is performed on the record receiving member having transparency. An image recorded with pigment-based inks exhibits good resistance against water and light in comparison with the conventional inks based on water-soluble dyes.

The polymeric dispersing agent used in the present invention can be prepared by mainly polymerization of vinyl monomers. The resultant polymer comprises at least the following monomer with tertiary amine salt or quaternary ammonium moiety as a cationic monomer. Examples of such vinyl monomers include N, N-dimethylaminoethyl methacrylate $[CH_2=C(CH_3)-COO-C_2H_4N(CH_3)_2]$, N, N-dimethylaminoethyl acrylate $[CH_2=CH-COO-C_2H_4N(CH_3)_2]$, N, N-dimethylaminopropyl methacrylate $[CH_2=C(CH_3)-COO-C_3H_6N(CH_3)_2]$, N, N-dimethylaminopropyl acrylate $[CH_2=CH-COO-C_3H_6N(CH_3)_2]$, N, N-dimethyl acrylamide $[CH_2=CH-CON(CH_3)_2]$, N, N-dimethyl methacrylamide $[CH_2=C(CH_3)-CON(CH_3)_2]$, N, N-dimethylaminoethyl acrylamide $[CH_2=CH-CONHC_2H_4N(CH_3)_2]$, N, N-dimethylaminoethyl methacrylamide $[CH_2=C(CH_3)-CONHC_2H_4(CH_3)_2]$, N, N-dimethylaminopropyl acrylamide $[CH_2=CH-CONH-C_3H_6N(CH_3)_2]$, N, N-dimethylaminopropyl methicrylamide $[CH_2=C(CH_3)-CONH-C_3H_6N(CH_3)_2]$. In the case of tertiary amine monomer, compounds which form a salt with tertiary amine include hydrochloric acid, sulfuric acid, acetic acid and the like. Compounds which form a quaternary ammonium moiety with tertiary amine moiety include methyl chloride, dimethyl sulfate, benzyl chloride, epichlorohydrin and the like. In these compounds, methyl chloride and dimethyl sulfate are preferable in preparation for the dispersing agents. The above tertiary amine salts or quaternary ammonium moieties behave as a cation in water, and exhibit a stable solubility in an acid region under neutralized conditions. A content of such monomers in copolymer is preferably from 20 to 60% by weight.

Examples of other suitable monomers constituting the above-mentioned polymeric dispersing agent used in the present invention include 2-hydroxyethyl methacrylate, acrylates having a hydroxy group and a long side chain like an ethylene oxide chain, a hydrophobic monomer such as styrenic monomer, and water-soluble monomers at about pH 7, such as acrylamides, vinyl ethers, vinylpyrrolidones, vinylpyridines, and vinyloxazolines. Examples of the hydrophobic monomer include styrene, styrene derivatives, vinylnaphthalene, vinylnaphthalene derivatives, and alkyl esters of (meth)acrylic acid. The content of a water-soluble monomer in the polymeric dispersing agent prepared by copolymerization is preferably from 15 to 35% by weight to obtain stability of the copolymer in water. A content of hydrophobic monomer in the polymeric dispersing agent is preferably from 20 to 40% by weight to obtain a high dispersion effect of the copolymer on pigments.

Examples of carbon black pigment (C. I. pigment black 7) for black ink used in the present invention include but are not limited to #2600, #2300, #990, #980, #960, #950, #900, #850, #750, #650, MCF-88, MA-600, #95, #55, #52, #47, #45, #45L, #44, #40, #33, #32, #30, #25, #20, #10, and #5 (manufactured by Mitsubishi Chemical Co., Ltd.)

Examples of pigments for yellow ink used in the present invention include but are not limited to C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, and C. I. Pigment Yellow 154.

Examples of pigments for magenta ink used in the present invention include but are not limited to C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57 :1, C. I. Pigment Red 112, C. I. Pigment Red 123, C. I. Pigment Red 168, C. I. Pigment Red 184, and C. I. Pigment Red 202.

Examples of pigments for cyan ink used in the present invention include but are not limited to C. I. Pigment Blue 1, C. I. Pigment Blue 2, C. I. Pigment Blue 3, C. I. Pigment Blue 15 : 3, C. I. Pigment Blue 15 : 34, C. I. Pigment Blue 16, C. I. Pigment Blue 22, C. I. Pigment Blue 60, C. I. Vat Blue 4, and C. I. Vat Blue 60.

Furthermore, if it is necessary to use an intermediate color such as red, green, or blue, the following pigments may be preferably used alone or in combination. Examples of the intermediate color pigments include but are not limited to C. I. Pigment Red 209, C. I. Pigment Red 122, C. I. Pigment Red 224, C. I. Pigment Red 177, C. I. Pigment Red 194, C. I. Pigment Orange 43, C. I. Vat Violet 3, C. I. Pigment Violet 19, C. I. Pigment Green 36, C. I. Pigment Green 7, C. I. Pigment Violet 23, C. I. Pigment Violet 37, C. I. Pigment Blue 15 : 6, C. I. Pigment Blue 209.

In addition, dyes may be contained in the above color inks. Examples of suitable yellow dyes for yellow ink include but are not limited to C. I. Acid Yellow 11, C. I. Acid Yellow 17, C. I. Acid Yellow 23, C. I. Acid Yellow 25, C. I. Acid Yellow 29, C. I. Acid Yellow 42, C. I. Acid Yellow 49, C. I. Acid Yellow 61, C. I. Acid Yellow 71, C. I. Direct Yellow 12, C. I. Direct Yellow 24, C. I. Direct Yellow 26, C. I. Direct Yellow 44, C. I. Direct Yellow 86, C. I. Direct Yellow 87, C. I. Direct Yellow 98, C. I. Direct Yellow 100, C. I. Direct Yellow 130, and C. I. Direct Yellow 142.

Examples of suitable magenta dyes for magenta ink include but are not limited to C. I. Acid Red 1, C. I. Acid Red 6, C. I. Acid Red 8, C. I. Acid Red 32, C. I. Acid Red 35, C. I. Acid Red 37, C. I. Acid Red 51, C. I. Acid Red 52, C. I. Acid Red 80, C. I. Acid Red 85, C. I. Acid Red 87, C. I. Acid Red 92, C. I. Acid Red 94, C. I. Acid Red 115, C. I. Acid Red 180, C. I. Acid Red 254, C. I. Acid Red 256, C. I. Acid Red 289, C. I. Acid Red 315, C. I. Acid Red 317, C. I. Direct Red 1, C. I. Direct Red 4, C. I. Direct Red 13, C. I. Direct Red 17, C. I. Direct Red 23, C. I. Direct Red 28, C. I. Direct Red 31, C. I. Direct Red 62, C. I. Direct Red 79, C. I. Direct Red 81, C. I. Direct Red 83, C. I. Direct Red 89, C. I. Direct Red 227, C. I. Direct Red 240, C. I. Direct Red 242, and C. I. Direct Red 243.

Examples of suitable cyan dyes for cyan ink include but are not limited to C. I. Acid Blue 9, C. I. Acid Blue 22, C. I. Acid Blue 40, C. I. Acid Blue 59, C. I. Acid Blue 93, C. I. Acid Blue 102, C. I. Acid Blue 104, C. I. Acid Blue 113, C. I. Acid Blue 117, C. I. Acid Blue 120, C. I. Acid Blue 167, C. I. Acid Blue 229, C. I. Acid Blue 234, C. I. Acid Blue 254, C. I. Direct Blue 6, C. I. Direct Blue 22, C. I. Direct Blue 25, C. I. Direct Blue 71, C. I. Direct Blue 78, C. I. Direct Blue 86, C. I. Direct Blue 90, C. I. Direct blue 106, and C. I. Direct Blue 199. Even in a case of using these dyes in combination, a particle diameter and a content of pigments in respective inks must fall within the required range given below.

When the above cationic water-soluble polymer is used as the dispersing agent to disperse pigments, it is preferred that pigments have an isoelectric point which is adapted to indicate more than 6, or a pH of the pigment as a monodispersion in pure water which characterizes the pigment is neutral or basic, for example from 7 to 10, from the viewpoint of dispersibility. It should be understood that this indicates a strong interaction between the pigment and the cationic water-soluble polymer.

In order to obtain an aqueous dispersion where fine particle pigments are dispersed by use of the above materials in the present invention, the following procedures are preferably used.

(1) In a case of carbon black:

Carbon black is subjected to a premixing treatment in a dispersion containing the cationic dispersing agent, followed by a milling process with a dispersion device at a high shear rate. After dilution, the resultant dispersion is subjected to a centrifuge treatment to remove coarse pigments. Some materials are then added to form the desired black ink. An aging treatment may be performed, if desired. Finally, this dispersion is subjected to a centrifuge treatment to obtain the pigment dispersion having a desired average particle diameter. A pH range of ink prepared by the above procedure is preferably from 3 to 9.

(2) In a case of color pigments other than carbon black:

The same procedure as for carbon black is also carried out, except for use of the anionic dispersing agent. In a case of a serious difficulty in making an organic pigment fine, a surface active treatment can be performed just after preparation of the pigment, or during preparation of the pigment to inhibit a crystal growth of a pigment particle. A pigment which is treated to enhance wettability is preferably used. A pH of the ink prepared by the above procedure is preferably in the range of 5 to 10. From the standpoint of dispersion stability, a necessary average particle diameter is preferably in the range of 0.02 to 1 $\mu$m, and more preferably 0.03 to 0.4 $\mu$m, in the case of any of black ink based on carbon black and other color inks. Furthermore the necessary requirement of the average particle diameter for prevention of nozzle clogging will be described later. Additionally, a surface tension of the inks suited for the present invention is preferably in the range of 10 to 60 dyn/cm.

When a recording on a plain paper with such as the above inks is carried out, an interfacial tension of black pigment-based ink against the plain paper is preferably high from the viewpoint of vividness of recorded characters. On the other hand, to reduce interdiffusion between color inks which leads to a color bleeding phenomenon, the interfacial tension of the color inks against the plain paper is preferably low because a high penetration rate into the plain paper creates a good recording image. Since black ink has a high interfacial tension in an acidic region and color inks have a low interfacial tension in a basic region, black ink does not tend to spread into color inks, so that color bleeding between black ink and color inks can be substantially eliminated. Herein, a value of interfacial tension between the above inks and the paper can be determined by a commercial dynamic wettability test device based on a Wilhelmy method. A high interfacial tension indicates that a contact angle for paper is more than 90 degrees during a short period of 1 to a few seconds after placing an ink on the paper, a low interfacial tension means that the contact angle is less than 90 degrees under the same conditions.

A dispersing agent for color inks used in the present invention is an alkaline-soluble resin, and its weight-average molecular weight generally ranges from 1,000 to 30,000, preferably 3,000 to 15,000. More specifically, such resins are copolymers and salts thereof comprising a hydrophobic monomer, such as styrene, styrene derivatives, vinylnaphthalene, vinylnaphthalene derivatives, alkyl esters of acrylic or methacrylic acid, and the like, and a hydrophilic monomer, such as $\alpha$, $\beta$-ethylenic unsaturated carboxyl acid, its esters of aliphatic alcohol, acrylic or methacrylic acid, maleic acid, itaconic acid, fumaric acid, derivatives thereof, and the like. Copolymers may have any form of random, block, and graft structures, and an acid value of such resins generally ranges from 100 to 430, preferably 130 to 360. In addition, examples of the dispersing agent used in the present invention also include water-soluble polymers or resins, such as polyvinyl alcohol, carboxymethylated cellulose, naphthalenesulfonic acid-formaldehyde polycondensation product, polystyrenesulfonic acid, and the like. The alkaline-soluble polymers permit dispersion to be made easily and become low viscous, as compared to water-soluble polymers. An amount of the polymer in ink, where the polymer is not attached to the pigment and dissolves in water, is preferably less than 4% by weight, although an amount of the dispersing agent can be determined experimentally by use of selected pigment and the dispersing agent.

It is necessary to add bases when the above dispersing agent is used in an aqueous medium. Examples of suitable bases used in the present invention include but are not limited to monoethanolamine, diethanolamine, triethanolamine, N-methyl-ethanolamlne, N-ethyl-diethanolamine, 2-amino-2-methylpropanol, 2-ethyl-2-amino-1,3-propanediol, 2-(2-aminoethyl)ethanolamine, tris (hydroxymethyl)aminomethane, ammonia, piperidine, morpholine, $\beta$-dihydroxyethylurea and other organic bases, sodium hydroxide, potassium hydroxide, lithium hydroxide and other inorganic bases. The most suitable bases are preferably non-volatile, stable, and have a high water-holding ability, depending upon the choice of the pigments and the dispersing agents. An amount of the bases is determined by an acid value of the dispersing agents so that they are used to neutralize the agents. In some cases, a large amount of the bases as compared to the acid value is often used in order to improve dispersibility, moisture holding ability, and adjust the ink pH and recording characteristics, or the like.

Organic solvents for ink used in the present invention have excellent miscibility with water. The organic solvents are classified into the following three groups. A first group solvent has a high moisture holding ability, a non-volatile property, and a high hydrophilicity. A second group solvent has an organic property to some extent, a good wettability for a hydrophobic surface, and a vaporization drying property. A third group solvent which is monohydric alcohol has a suitable wettability and low viscosity.

Examples of the first group solvents include ethylene glycol, diethylene glycol, triethylene glycol, tripropylene glycerol, 1, 2, 4-butanetriol, 1, 2, 6-hexanetriol, 1, 2, 5-pentanetriol, 1, 2-butanediol, 1, 3-butanediol, 1, 4-butanediol, dimethyl sulfoxide, diacetonealcohol, glycerol monoallyl ether, propylene glycol, butylene glycol, polyethylene glycol 300, thioglycol, N-methyl-2-pyrrolidone, 2-pyrrolidone, γ-butyrolactone, 1, 3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monoethyl ether, propylene glycol monomethyl ether, dipropylene glycol monomethyl ether, β-dihydroxyethylurea, urea, acetonylacetone, pentaerythritol, 1, 4-cyclohexanediol.

Examples of the second group solvents include hexylene glycol, ethylene glycol monopropyl ether, ethylene glycol monobutyl ether, ethylene glycol monoisobutyl ether, ethylene glycol monophenyl ether, diethylene glycol diethyl ether, diethyleneglycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1, 2-cyclohexanediol, 1-butanol, 3-methyl-1, 5-pentanediol, 3-hexene-2,5-diol, 2, 3-butanediol, 1, 5-pentanediol, 2, 4-pentanediol and 2, 5-hexanediol.

Examples of the third group solvents include ethanol, n-butanol, 2-propanol, 1-methoxy-2-propanol, furfuryl alcohol, tetrahydro-furfurylalcohol. The above solvents may be used alone or in a combination of two or more thereof. The content of the solvents in the ink is preferably about 5 to 40% by weight.

Each aqueous pigment-based ink constituting the inks in the present invention may also include surface active agents, pH adjusting agents, and antiseptics, or the like. The surface active agents commercially available are helpful to prepare a color ink which has good penetration into the recording member, to heat the ink in the bubble-jet method, and to adjust wettability against a surface of the nozzle. To summarize properties of the inks formed of the above materials, it is preferred that the black ink has a high surface tension (approximately 30 to 60 dyn/cm), whereas it is preferred that the color inks have a low surface tension (approximately 10 to 40 dyn/cm).

Using the black and color inks in the present invention, a high-quality recording which has no color bleeding between black and color images can be accomplished when color recording is performed for plain papers.

When recording is accomplished with the color inks in the present invention, it is possible to use any of general plain paper, special coated paper, and plastic film for overhead projector. As mentioned above, the ink used in the present invention can be applied to all ink-jet recording methods. Above all, the inks in the present invention are preferably suitable for an ink-jet recording method in which the ink can be emitted by the vapor bubble generated by heating application, so that ink droplet emission is very stable and a clear image without satellite dots or the like can be provided. In this case, thermal properties, such as specific gravity, thermal expansion coefficient and thermal conductivity or the like must be adjusted to achieve a good recording.

The features in the present invention will be described as follows. As noted above, the present invention relates to the ink-jet recording method in which ink droplets can be ejected from a smaller orifice. However, nozzle clogging presents a serious problem in this method. Nozzle clogging tends to takes place when using pigment-based ink rather than dye-based ink, because pigment is not dissolved but dispersed in the liquid. In addition, this nozzle clogging problem is extremely grave since the present invention employs the smaller orifice of the nozzle as compared to the conventional one, the present invention having, for example, an orifice diameter of less than $\phi 25$ $\mu$m (less than 500 $\mu m^2$ in terms of cross-sectional area of the orifice). Nozzle clogging is derived from the principle of the ink-jet recording method wherein an ink droplet is ejected from a small orifice. In other words, this problem is due to the small orifice. The diameter of the orifice thus correlates closely with the size of pigment which is a so-called alien substance in the ink.

The present invention has focused on the sizes of the orifice and pigment, and we have discovered relationships to prevent nozzle clogging. More specifically, presence or absence of nozzle clogging was examined with respect to ink-jet recording using inks of various pigment sizes and various orifice diameters for a constant period, followed by allowing the present apparatus to stand for a constant period. In this experiment, a partial nozzle clogging and a prior sign of nozzle clogging (slight nozzle clogging) as well as complete nozzle clogging were regarded as nozzle clogging.

The ink-jet recording head based on thermal energy, which recording head was used in this experiment, is shown in FIG. 3B. FIG. 1A shows that a tip of the ink passageway is the orifice of the nozzle, but the nozzle used in this experiment was covered with the nozzle plate 20 having the same number of orifices 21 as number of nozzles 4 in FIG. 1A. FIG. 3A shows a perspective view of the recording head before attachment of the nozzle plate 20, and FIG. 3B illustrates a perspective view of the recording head after the nozzle plate is attached. Although FIGS. 1A and 3B show only four nozzles for simplicity, the actual number of the nozzles used in this experiment was 128, to give 400 dpi resolution. Other conditions for recording were as follows. A size of the heating element was 22 $\mu$m×90 $\mu$m, its resistance value was 110 $\phi$, a drive voltage of ink ejection was 24 V, a width of a drive pulse was 6.5 $\mu$s, and a drive frequency was 12 kHz. Additionally, different recording heads H1 to H4 having respective orifice diameter of $\phi 25$ $\mu$m, $\phi 20$ $\mu$m, $\phi 15$ $\mu$m, and $\phi 10$ $\mu$m were prepared. A thickness of each of the nozzle plate was 40 $\mu$m.

The inks used in this experiment can be formed of the following composition and by the following process. The experiment was conducted using inks with pigment diameters ranging from 0.005 $\mu$m to 1 $\mu$m in combination with the four distinct nozzle diameters of the recording heads H1 to H4. Standing conditions after performing ink ejection for a constant period were standing for 10 hours at a temperature of 40° C. and 30% humidity.

The process for making the inks was as follows. Using a solution where styrene / methacrylic acid / butyl acrylate copolymer P1 having an acid value of 325, the weight-average molecular weight of 11,000 and a glass transition temperature of 84° C. was dissolved by use of potassium hydroxide, the following carbon black dispersions D1 to D17 were made.

| Materials | Parts |
| --- | --- |
| Copolymer P1 (20% by weight) | 40 |
| Carbon black MCF-88 (Mitsubishi Chemical) | 24 |
| Diethylene glycol | 20 |
| Isopropyl alcohol | 10 |
| Water | 130 |

These materials was added to a batch-type longitudinal sand mill device (manufactured by AIMEX CO., LTD.) filled with glass beads, and a dispersion treatment was continued for 3 hours during water cooling to give a crude dispersion with a viscosity of 17 cp and a pH of 9.6. This dispersion was centrifuged to remove large particles. Varying the conditions for centrifugation provided the dispersions D1 to D17 having an average diameter ranging from 0.005 μm to 1 μm. Dilution of these dispersions with water gave black basic ink-jet inks B1 to B17 with a viscosity of 2.5 cp, a surface tension of 45 dyn/cm, and a pH of 9.5. A solid content of a final ink was about 7% by weight. A final amount of pigment in these inks was 5% by weight. An average diameter of the pigment was determined by a particle size distribution measurement device (Otsuka Electronics Co., LTD.) using a dynamic light scattering method. The average value was obtained from an initial gradient of an autocorrelation function.

In combinations of these inks B1 to B17 with the recording heads H1 to H4, nozzle clogging occurrence was examined to provide the results as shown in Tables 1 to 4.

TABLE 1

In a case of the recording head H1 ($D_0 = \phi 25$ μm)

| Ink | Pigment diameter $D_p$(μm) | $D_p/D_o$ | (Nozzle number subjected to nozzle clogging)/ (total nozzle number) | Judgment |
| --- | --- | --- | --- | --- |
| B1 | 0.005 | 0.0002 | 1) | X |
| B2 | 0.01 | 0.0004 | 1) | X |
| B3 | 0.02 | 0.0008 | 0/128[2] | ◯ |
| B4 | 0.03 | 0.0012 | 0/128 | ◯ |
| B5 | 0.04 | 0.0016 | 0/128 | ◯ |
| B6 | 0.05 | 0.002 | 0/128 | ◯ |
| B7 | 0.06 | 0.0024 | 0/128 | ◯ |
| B8 | 0.07 | 0.0028 | 0/128 | ◯ |
| B9 | 0.08 | 0.0032 | 0/128 | ◯ |
| B10 | 0.09 | 0.0036 | 0/128 | ◯ |
| B11 | 0.1 | 0.004 | 0/128 | ◯ |
| B12 | 0.15 | 0.006 | 0/128 | ◯ |
| B13 | 0.2 | 0.008 | 0/128 | ◯ |
| B14 | 0.25 | 0.01 | 0/128 | ◯ |
| B15 | 0.3 | 0.012 | 2/128(partial clogging) | Δ |
| B16 | 0.4 | 0.016 | 5/128(partial clogging) | Δ |
| B17 | 1 | 0.04 | 32/128(complete clogging) | X |

[1] No evaluation was performed due to ink instability.
[2] A slight instability of the ink was observed.

TABLE 2

In a case of the recording head H2 ($D_0 = \phi 20$ μm)

| Ink | Pigment diameter $D_p$(μm) | $D_p/D_o$ | (Nozzle number subjected to nozzle clogging)/ (total nozzle number) | Judgment |
| --- | --- | --- | --- | --- |
| B1 | 0.005 | 0.00025 | 1) | X |
| B2 | 0.01 | 0.0005 | 1) | X |
| B3 | 0.02 | 0.0010 | 0/128[2] | ◯ |
| B4 | 0.03 | 0.0015 | 0/128 | ◯ |
| B5 | 0.04 | 0.002 | 0/128 | ◯ |
| B6 | 0.05 | 0.0025 | 0/128 | ◯ |
| B7 | 0.06 | 0.003 | 0/128 | ◯ |
| B8 | 0.07 | 0.0035 | 0/128 | ◯ |
| B9 | 0.08 | 0.004 | 0/128 | ◯ |
| B10 | 0.09 | 0.0045 | 0/128 | ◯ |
| B11 | 0.1 | 0.005 | 0/128 | ◯ |
| B12 | 0.15 | 0.0075 | 0/128 | ◯ |
| B13 | 0.2 | 0.01 | 0/128 | ◯ |
| B14 | 0.25 | 0.0125 | 2/128(partial clogging) | Δ |
| B15 | 0.3 | 0.015 | 4/128(partial clogging) | Δ |
| B16 | 0.4 | 0.02 | 5/128(complete clogging) | X |
| B17 | 1 | 0.05 | 48/128(complete clogging) | X |

[1] No evaluation was performed due to ink instability.
[2] A slight instability of the ink was observed.

TABLE 3

In a case of the recording head H3 ($D_0 = \phi 15$ μm)

| Ink | Pigment diameter $D_p$(μm) | $D_p/D_o$ | (Nozzle number subjected to nozzle clogging)/ (total nozzle number) | Judgment |
| --- | --- | --- | --- | --- |
| B1 | 0.005 | 0.00033 | 1) | X |
| B2 | 0.01 | 0.00067 | 1) | X |
| B3 | 0.02 | 0.00133 | 0/128[2] | ◯ |
| B4 | 0.03 | 0.002 | 0/128 | ◯ |
| B5 | 0.04 | 0.00267 | 0/128 | ◯ |
| B6 | 0.05 | 0.0033 | 0/128 | ◯ |
| B7 | 0.06 | 0.004 | 0/128 | ◯ |
| B8 | 0.07 | 0.00467 | 0/128 | ◯ |
| B9 | 0.08 | 0.0053 | 0/128 | ◯ |
| B10 | 0.09 | 0.006 | 0/128 | ◯ |
| B11 | 0.1 | 0.0067 | 0/128 | ◯ |
| B12 | 0.15 | 0.01 | 0/128 | ◯ |
| B13 | 0.2 | 0.013 | 4/128(partial clogging) | Δ |
| B14 | 0.25 | 0.0167 | 11/128(partial clogging) | Δ |
| B15 | 0.3 | 0.02 | 27/128(complete clogging) | X |
| B16 | 0.4 | 0.0267 | 52/128(ccomplete clogging) | X |
| B17 | 1 | 0.067 | 128/128(complete clogging) | X |

[1] No evaluation was performed due to ink instability.
[2] A slight instability of the ink was observed.

TABLE 4

In a case of the recording head H4 ($D_0 = \phi 10$ μm)

| Ink | Pigment diameter $D_p$(μm) | $D_p/D_o$ | (Nozzle number subjected to nozzle clogging)/ (total nozzle number) | Judgment |
| --- | --- | --- | --- | --- |
| B1 | 0.005 | 0.0005 | 1) | X |
| B2 | 0.01 | 0.001 | 1) | X |
| B3 | 0.02 | 0.002 | 0/128[2] | ◯ |
| B4 | 0.03 | 0.003 | 0/128 | ◯ |
| B5 | 0.04 | 0.004 | 0/128 | ◯ |
| B6 | 0.05 | 0.005 | 0/128 | ◯ |
| B7 | 0.06 | 0.006 | 0/128 | ◯ |
| B8 | 0.07 | 0.007 | 0/128 | ◯ |
| B9 | 0.08 | 0.008 | 0/128 | ◯ |
| B10 | 0.09 | 0.009 | 0/128 | ◯ |
| B11 | 0.1 | 0.01 | 0/128 | ◯ |
| B12 | 0.15 | 0.015 | 6/128(partial clogging) | Δ |
| B13 | 0.2 | 0.02 | 15/128(complete clogging) | X |
| B14 | 0.25 | 0.025 | 44/128(complete clogging) | X |
| B15 | 0.3 | 0.03 | 128/128(complete clogging) | X |
| B16 | 0.4 | 0.04 | 128/128(complete clogging) | X |

TABLE 4-continued

In a case of the recording head H4 ($D_o = \phi 10 \mu m$)

| Ink | Pigment diameter $D_p(\mu m)$ | $D_p/D_o$ | (Nozzle number subjected to nozzle clogging)/ (total nozzle number) | Judgment |
|---|---|---|---|---|
| B17 | 1 | 0.1 | 128/128(complete clogging) | X |

[1] No evaluation was performed due to ink instability.
[2] A slight instability of the ink was observed.

From the above results, a stable ink droplet ejection in the absence of nozzle clogging was accomplished when the pigment diameter $D_p$ and the orifice diameter $D_o$ satisfied a relationship $0.001 \leq D_p/D_o \leq 0.01$. In this experiment, the orifice is round, but this relationship can be converted into a modified one based on the area ratio if the orifice is a polygon.

As noted above, the ink used in this experiment was based on not dyes but pigments which act as color agents for recording compositions. The content of pigment in the ink has an important influence on nozzle clogging. To investigate the relation between the pigment content in the ink and nozzle clogging, the following experiment was performed using the above recording head H2 (orifice diameter $D_o = \phi 20$ $\mu m$) and pigment diameter $D_p = 0.03$ $\mu m$ in the ink (B4), while varying the contents of the pigment and copolymer P1 dispersing agent as described above. An examination method for nozzle clogging was followed by the same procedure as the previous one. Table 5 shows the results.

TABLE 5

| Pigment content (% by weight) | Solid weight (%) | (Nozzle number subjected to nozzle clogging/ (total nozzle number) | Judgment |
|---|---|---|---|
| 1 | 3 | 0/128 | X[1] |
| 1 | 6 | 0/128 | X[1] |
| 1 | 10 | 0/128 | X[1] |
| 1 | 15 | 0/128 | X[1] |
| 1 | 20 | 22/128 | X[1] |
| 2 | 3 | 0/128 | ◯ |
| 2 | 6 | 0/128 | ◯ |
| 2 | 10 | 0/128 | ◯ |
| 2 | 15 | 0/128 | ◯ |
| 2 | 20 | 25/128 | X |
| 3 | 6 | 0/128 | ◯ |
| 3 | 10 | 0/128 | ◯ |
| 3 | 15 | 0/128 | ◯ |
| 3 | 20 | 37/128 | X |
| 4 | 6 | 0/128 | ◯ |
| 4 | 10 | 0/128 | ◯ |
| 4 | 15 | 0/128 | ◯ |
| 4 | 20 | 41/128 | X |
| 5 | 6 | 0/128 | ◯ |
| 5 | 10 | 0/128 | ◯ |
| 5 | 15 | 0/128 | ◯ |
| 5 | 20 | 48/128 | X |
| 6 | 6 | 0/128 | ◯ |
| 6 | 10 | 0/128 | ◯ |
| 6 | 15 | 0/128 | ◯ |
| 6 | 20 | 52/128 | X |
| 7 | 6 | 0/128 | ◯ |
| 7 | 10 | 0/128 | ◯ |
| 7 | 15 | 0/128 | ◯ |
| 7 | 20 | 54/128 | X |
| 8 | 6 | 0/128 | ◯ |
| 8 | 10 | 0/128 | ◯ |
| 8 | 15 | 0/128 | ◯ |
| 8 | 20 | 61/128 | X |
| 9 | 6 | 0/128 | ◯ |
| 9 | 10 | 0/128 | ◯ |
| 9 | 15 | 0/128 | ◯ |
| 9 | 20 | 66/128 | X |
| 10 | 6 | 0/128 | ◯ |
| 10 | 10 | 0/128 | ◯ |
| 10 | 15 | 0/128 | ◯ |
| 10 | 20 | 71/128 | X |
| 11 | 6 | 11/128 | X |
| 11 | 10 | 58/128 | X |
| 11 | 15 | 128/128 | X |
| 11 | 20 | 128/128 | X |
| 12 | 6 | 128/128 | X |
| 12 | 10 | 128/128 | X |
| 12 | 15 | 128/128 | X |
| 12 | 20 | 128/128 | X |

[1] Low color density and impractical.

From the results, it is preferred that the content of pigment in the ink is from 1 to 10% by weight, as a higher percentage than this range leads to nozzle clogging. In addition to pigment content, it is understood that a solid content of the ink must be less than 15% by weight. In case of pigment content of less than 1% by weight, color density is usually too low to use the ink practically, although no nozzle clogging occurs. However the low density ink may be used in a combination of a plurality of inks comprising high and low density inks. When only this low concentration ink is used, it is possible to supplement the density shortage by adding an additional dye.

Figure 4:
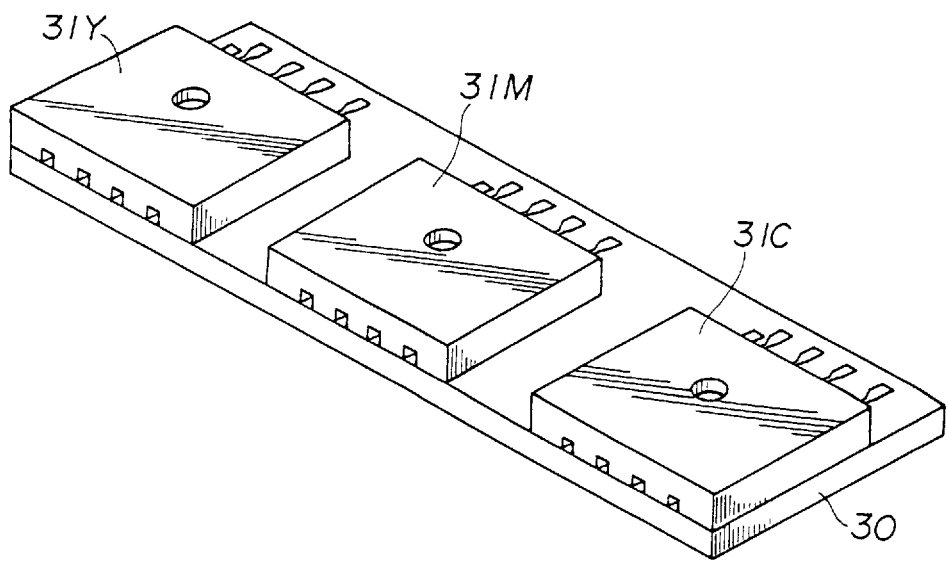
FIG. 4 shows another embodiment which is of a multi-color ink-jet recording head according to the present invention.

Other features in the present invention will be described in the following. Since the recording head in the present invention can be applied to multicolor recording, a structure of the ink-jet recording head for multicolor recording will be described as follows FIG. 4 shows another embodiment of the present invention, which is a multicolor ink-jet recording head. Referring to FIG. 4, this recording head is composed of a plurality of color ink nozzle elements, 31Y, 31M, and 31C, on a single common heating element substrate 30, corresponding to a plurality of Ecolors, yellow (Y), magenta (M), and cyan (C). In this example and in the following examples, only three to five ink nozzle elements and nozzles for each color are illustrated, but 64 to 512 elements and nozzles for each color may be provided.

Figure 5:
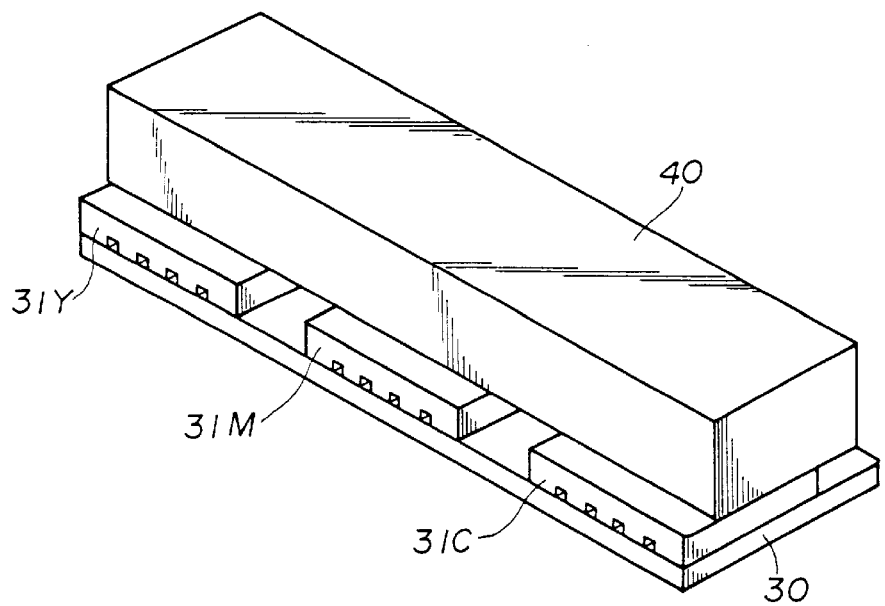
FIG. 5 shows the recording head shown in FIG. 4 equipped with an ink reservoir.

FIG. 5 shows the recording head shown in FIG. 4 equipped with an ink reservoir 40 which supplies each of the Y, M, and C inks. This figure illustrates a conceptual figure comprising a recording head part and an ink reservoir part constituting an ink-jet recording head of the present invention.

Figure 6:
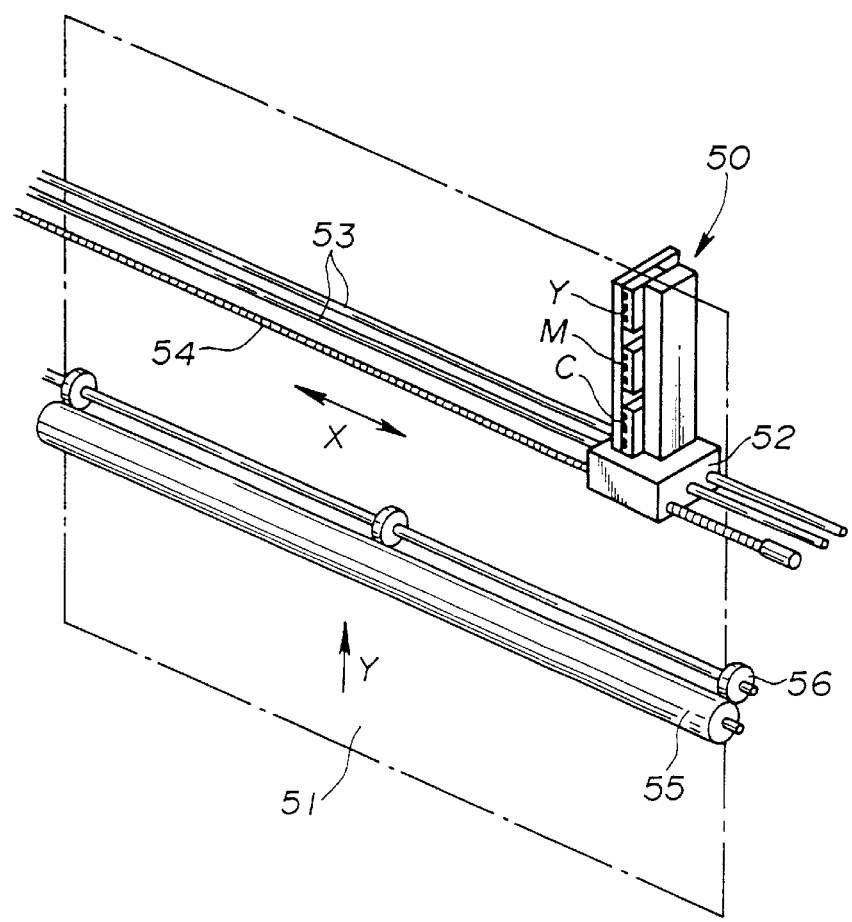
FIG. 6 shows a so-called serial printer structure in which an ink-jet recording head of the present invention is mounted on a carriage.

FIG. 6 shows a so-called serial printer structure in which the ink-jet recording head of the present invention is mounted on a carriage. This figure includes the ink-jet recording head 50 of the present invention, a recording paper 51, a carriage 52, guide rods 53 for the carriage, a screw rod 54 moving the carriage, a roller 55 transporting the recording paper, and a roller 56 pressing the recording paper. As shown in FIG. 6, the recording head 50, which is arranged with the color ink nozzle elements 31Y, 31M, and 31C aligned longitudinally (in this figure the recording head shown in FIG. 5 is mounted vertically.), can reciprocate in an X direction in this figure in front of the recording paper 51 to achieve a recording. The recording paper is moved in a Y direction in this figure whenever the carriage 52 Is scanned (that is, moved back and forth) one time. Accordingly, a region recorded for one scan corresponds to a length of a nozzle element. Because Y, M, and C inks are arranged in a line longitudinally, more than one scan provides a multicolor recording image by overlapping printing regions recorded with Y, M, and C inks.

Figure 7:
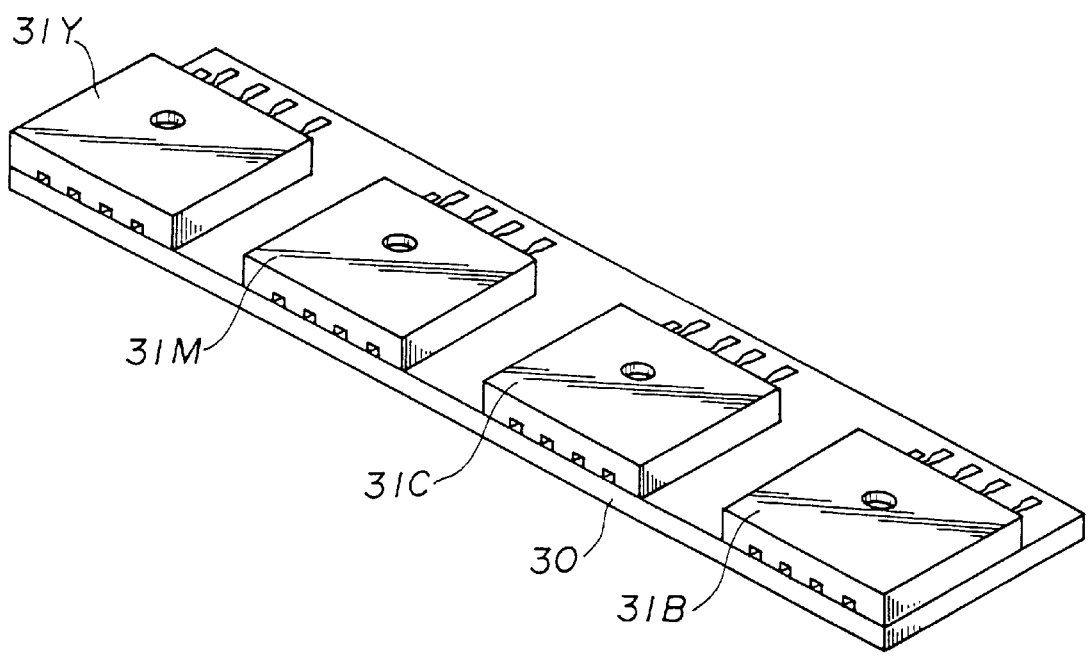
FIG. 7 shows ink nozzle elements for four color inks.

The above discussion is directed to an example showing the three colors Y, M, and C, but the present invention can be applied to a recording head equipped with four colors Including black ink. FIG. 7 shows the above case, wherein ink nozzle element 31B for black ink is added to the head shown in FIG. 4.

Figure 8:
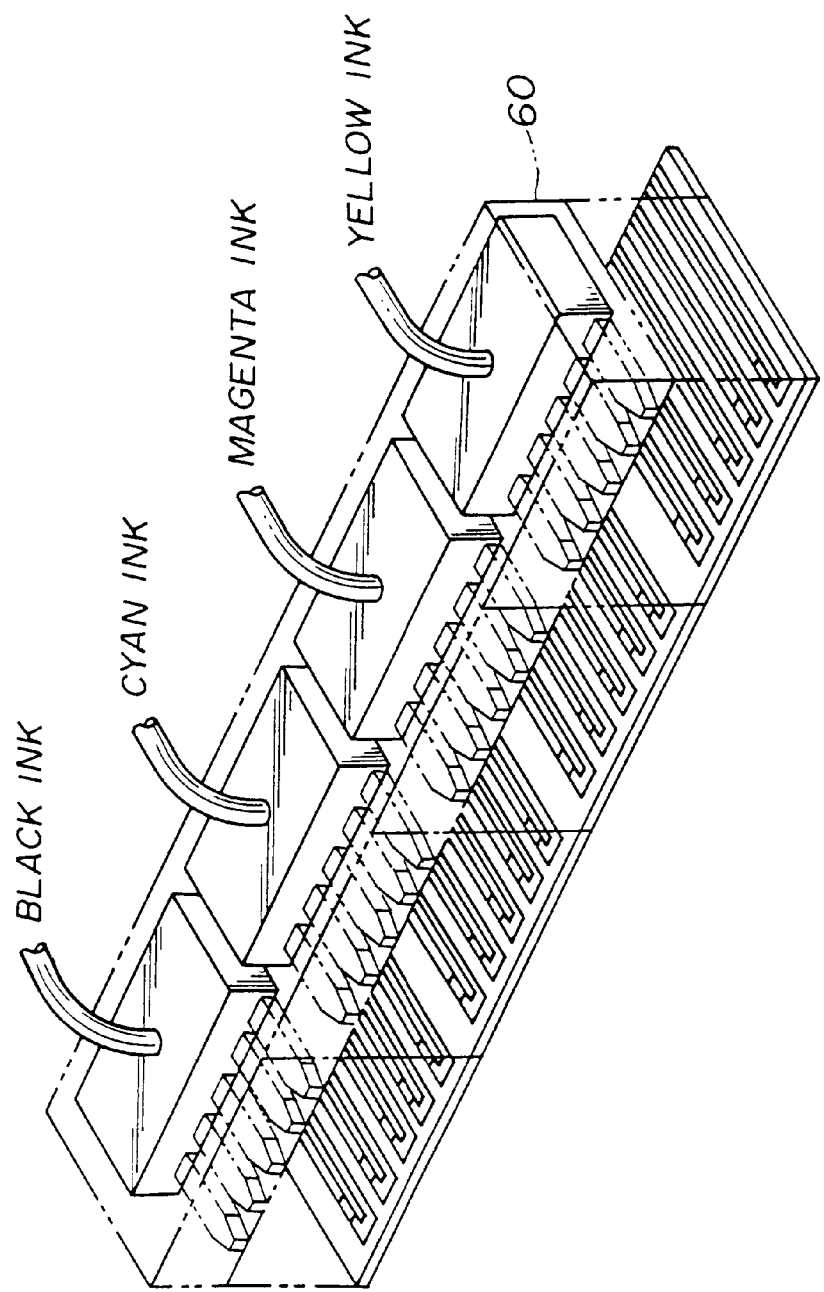
FIG. 8 shows another embodiment in which four color nozzles are formed integrally according to the present invention.

FIG. 8 shows another embodiment of the present invention, in which embodiment the recording head is provided with four separate color ink paths which are made by plastic molding integrally, thereby reducing assembly cost significantly.

Figure 9:
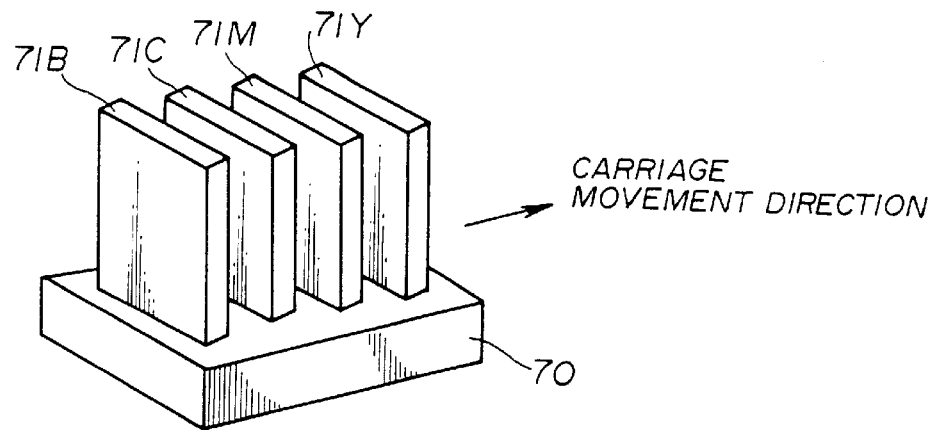
FIG. 9 shows four color recording heads filled with corresponding ink mounted on a single carriage separately.

In general, the color ink-jet recording apparatus is composed of a plurality of color ink heads which are filled with corresponding color inks and are mounted on a carriage 70 shown in FIG. 9. 71B, 71C, 71M, and 71Y correspond to recording heads of black ink, cyan ink, magenta ink, and yellow ink, respectively. This ensures a reliability of measures against nozzle clogging. For example, in a case in which the recording heads 71B, 71C, 71M, and 71Y, which are filled with the corresponding color inks, are mounted on the carriage 70 separately as shown in FIG. 9, an initial state of a clogged recording head can be recovered easily by replacing only the clogged recording head when nozzle clogging occurs in any one of the four recording heads.

Figure 10A:
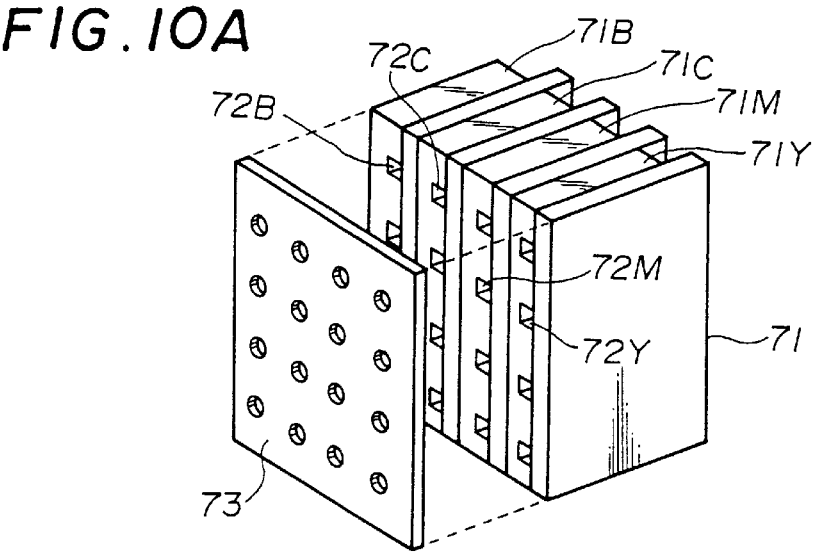
FIGS. 10A and 10B show another embodiment in which a plurality of color heads are stacked to form a recording head integrally according to the present invention.
Figure 10B:
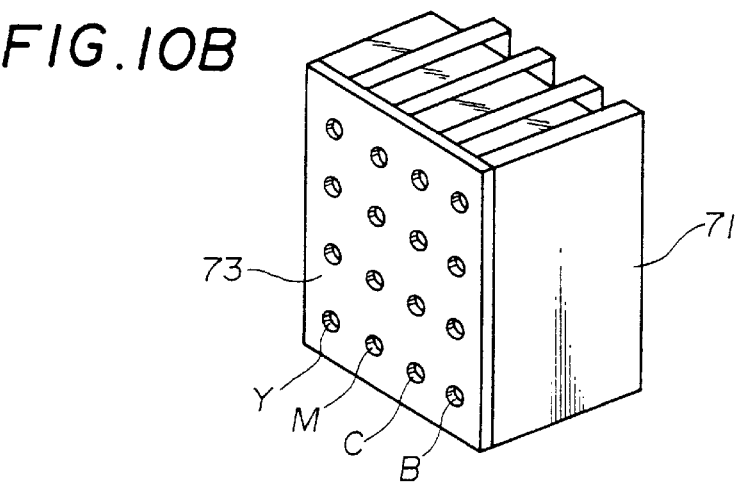

On the other hand, the recording heads which eject a plurality of color inks, as shown in FIGS. 4 to 8, are made integrally. As noted above, taking into consideration measures for nozzle clogging, it is preferred that the recording heads filled with corresponding color ink are mounted on the carriage separately, as shown in FIG. 9. The problem of nozzle clogging can be solved by optimizing the pigment diameter, and its content ratio and solid weight in the ink, as investigated in the present invention. Therefore, it is not necessary to mount the recording heads filled with the corresponding color inks on the carriage separately. The recording heads which eject a plurality of color inks, as shown in FIGS. 4 to 8, can be formed integrally in order to reduce assembly cost, realize a compact manufacture, and improve positional precision of color dots. Herein, the head formed integrally means stacked recording heads 71B, 71C, 71M, and 71Y which are filled with corresponding color inks integrally, as shown in FIGS. 10A and 10B, as well as the recording head mounted on the single common heating element substrate shown in FIGS. 4 to 8. In FIG. 10A, a single common nozzle plate 73 is provided on passageway tips 72B, 72C, 72M, and 72Y. FIG. 10A shows a recording head before attachment of the nozzle plate 73, and FIG. 10B shows the recording head after attachment of the plate 73. Since the single common nozzle plate 73 produced by an ablation technique with high accuracy is assembled to form an unitary recording head, it is possible to improve the positional precision of color dots as well as to reduce the manufacturing cost.

Figure 11B:
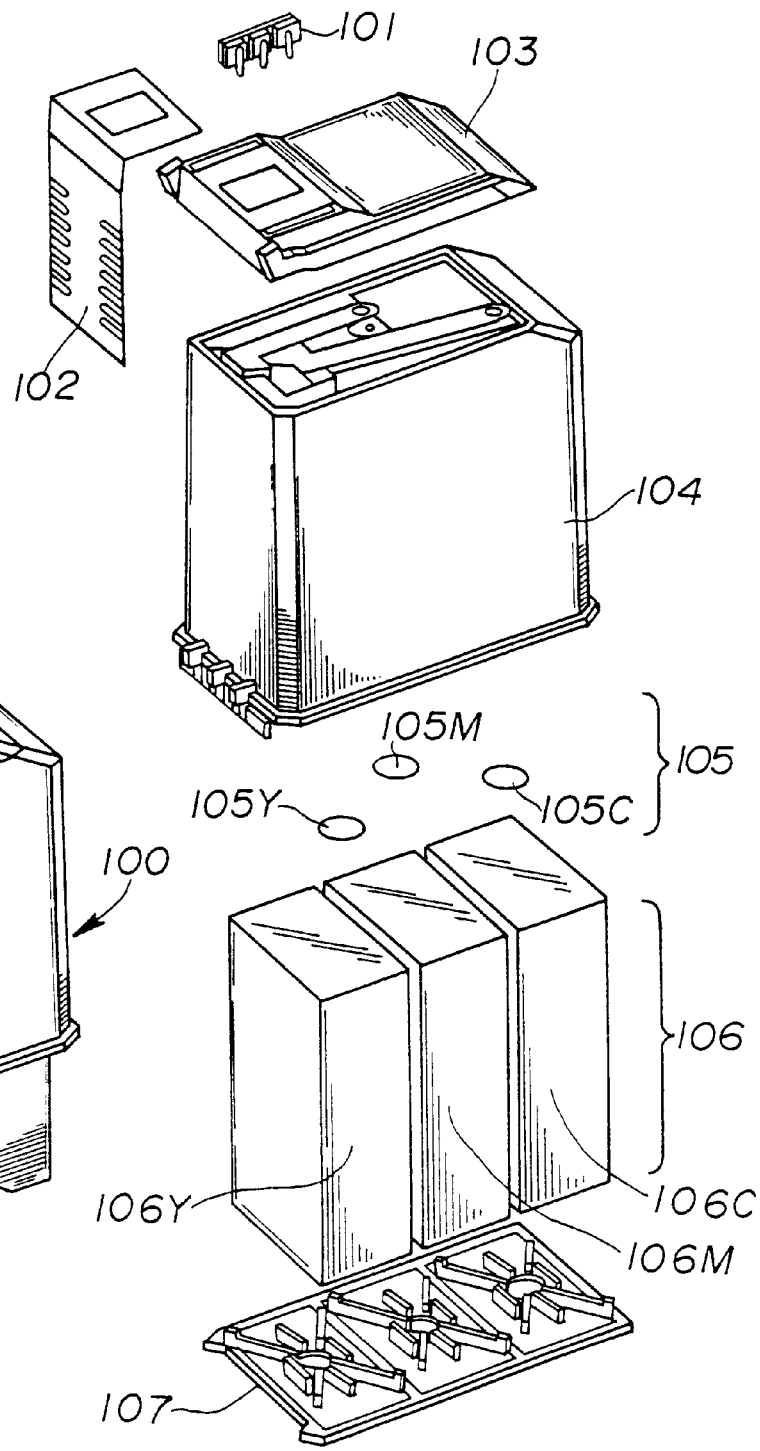
FIGS. 11A and 11B show another embodiment in which a recording head is formed integrally with a head unit and an ink reservoir according to the present invention.
Figure 11A:
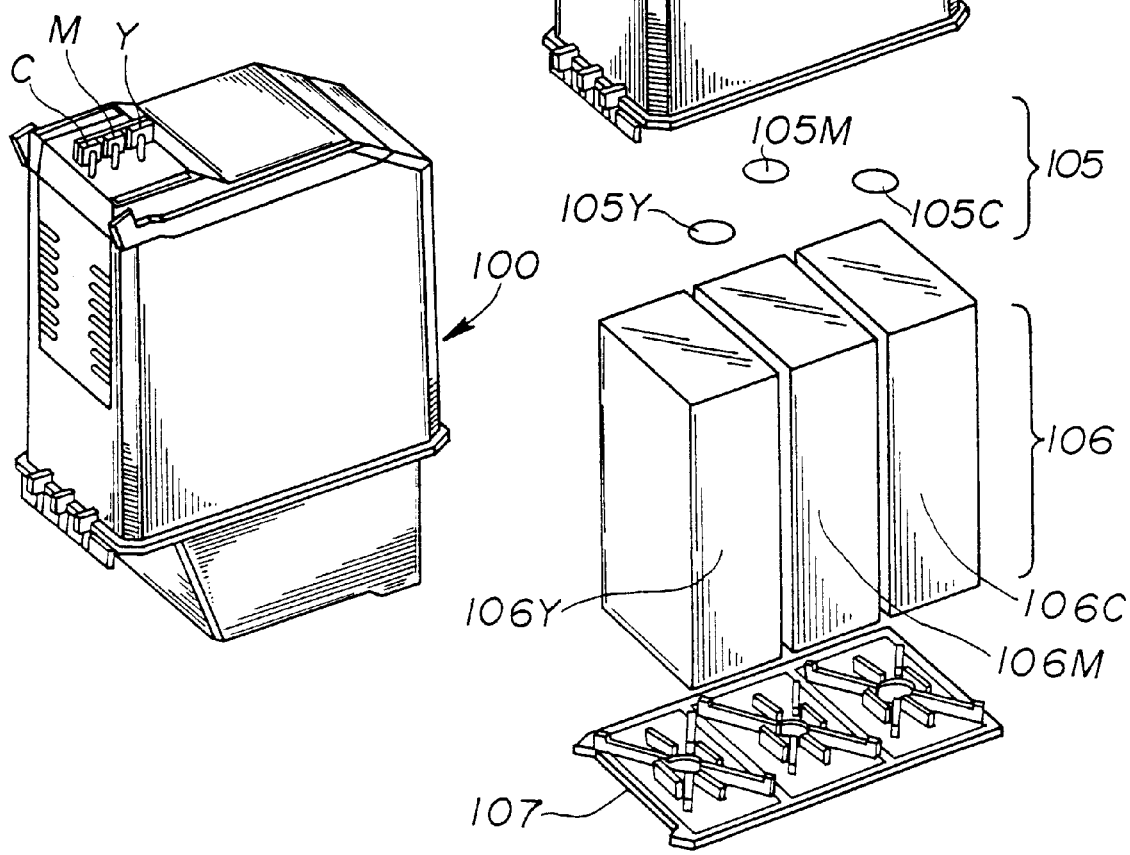

FIGS. 11A and 11B show another embodiment of a recording head of the present invention, which recording head is formed integrally of a head unit ejecting a plurality of color inks (the three colors of Y, M, and C in this embodiment) and an ink reservoir part. FIG. 11A shows a perspective view of the entire recording head and FIG. 11B shows an exploded perspective view of the recording head. In these figures, the recording head comprises a head unit 100, a head chip 101, a printed-circuit board 102, a cover plate 103, the ink reservoir part 104, a stainless mesh filter 105 (105Y, 105M, and 105C), foam 106, and a bottom plate 107. In this embodiment, the head unit and the ink reservoir which communicates with the head unit are divided into three parts inside the recording head, respectively, and Y, M, and C inks can be added to the respective parts of the ink reservoir. Since the head unit comprising a plurality of color recording heads can be constructed in a compact form, the carriage having the recording head mounted thereon can be miniaturized, thereby miniaturizing a motor driving the carriage and realizing energy saving.

Figure 12A:
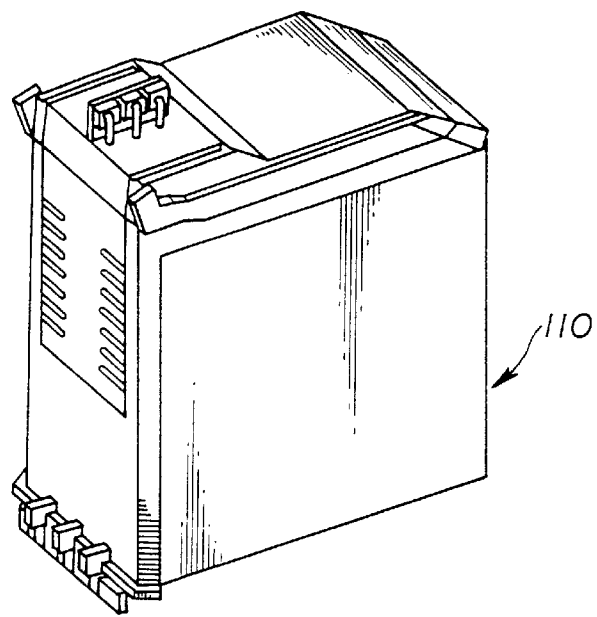
FIGS. 12A and 12B illustrate another embodiment, showing the unitary head unit shown in FIG. 11, except that only the ink reservoir is a detachable component according to the present invention.
Figure 12B:
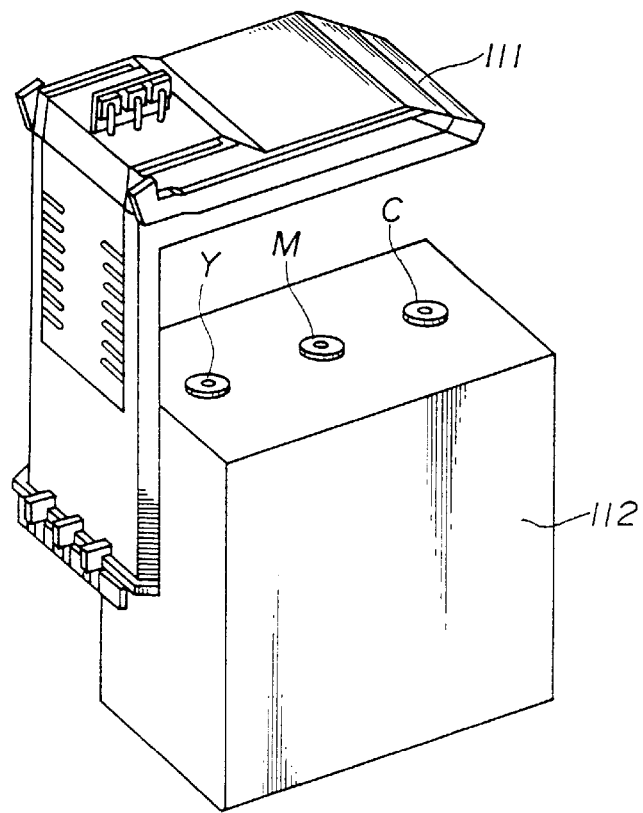

FIGS. 12A and 12B illustrate another embodiment of the present invention, showing the head unit shown in FIG. 11A, except that only the ink reservoir is a detachable component. FIG. 12A shows a perspective view of the entire head unit 110 and FIG. 12B shows a perspective view separating the head unit 110 into a recording head part 111 and an ink reservoir part 112. Even if large quantities of inks are consumed in color recording, reduction of an operation cost can be realized by replacing only the ink reservoir 112. Moreover, the advantages of the unitary color head described in FIG. 11A can still be maintained.

Figure 13A:
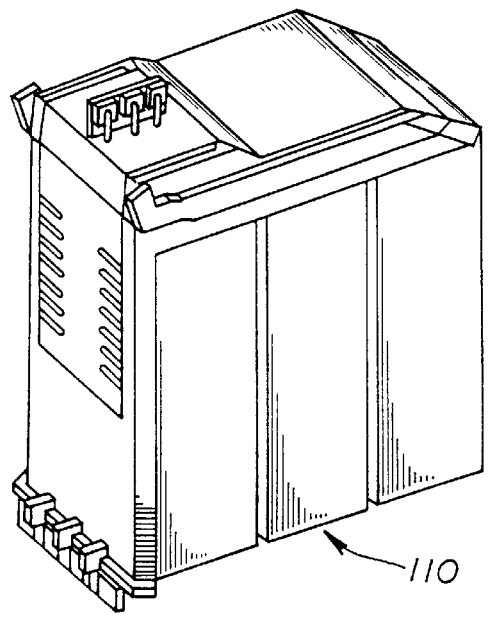
FIGS. 13A and 13B illustrate another embodiment, showing the unitary head unit, except that each color ink reservoir is a detachable component according to the present invention.
Figure 13B:
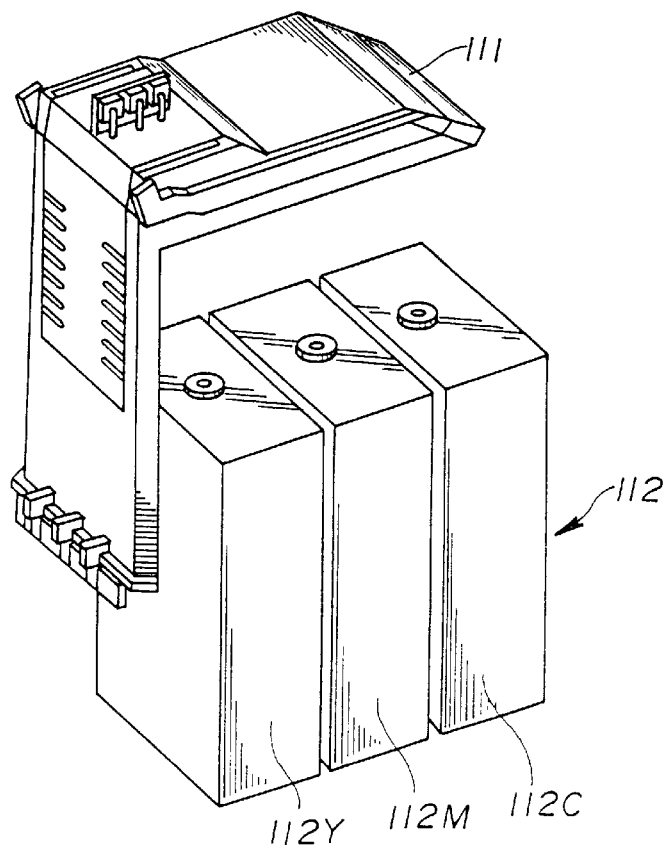

FIGS. 13A and 13B illustrate another embodiment of the present invention, showing the unitary head unit, except that each color ink reservoir is a detachable component. FIG. 13A shows a perspective view of the entire head unit 110 and FIG. 13B shows a perspective view separating the head unit 110 into the recording head part 111 and each color ink reservoir part 112 (more specifically, 112Y, 112M and 112C). An advantage of the above structure is that an empty color ink reservoir can be individually replaced to reduce the operating cost all the more, because the Y, M, and C inks are not necessarily all consumed at the same speeds.

As noted above, nozzle clogging is derived from the principle of the ink-jet recording method wherein an ink droplet is ejected from a small orifice. In other words, this problem is due to the small orifice. Therefore, there is a close relationship between the orifice, that is, the dimensions, geometry, and properties of the nozzle and the size of the pigment which is an alien substance in the ink.

In addition to the experiments mentioned above, the present invention has also focused on the dimensions, geometry, and properties of the nozzle and the pigment size, and we have discovered additional relationships to eliminate nozzle clogging. More specifically, occurrence of nozzle clogging was investigated with respect to ink-jet recording using inks of various pigment sizes and various nozzle plate thickness for a constant period, followed by allowing the present apparatus to stand for a constant period. In this experiment, a partial nozzle clogging and a prior sign of nozzle clogging (slight nozzle clogging) as well as complete nozzle clogging were regarded as nozzle clogging.

Figure 14A:
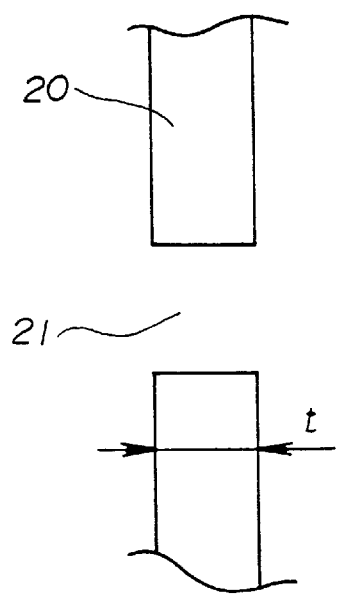
FIGS. 14A and 14B show a sectional schematic view of two types of nozzles according to the present invention.
Figure 14B:
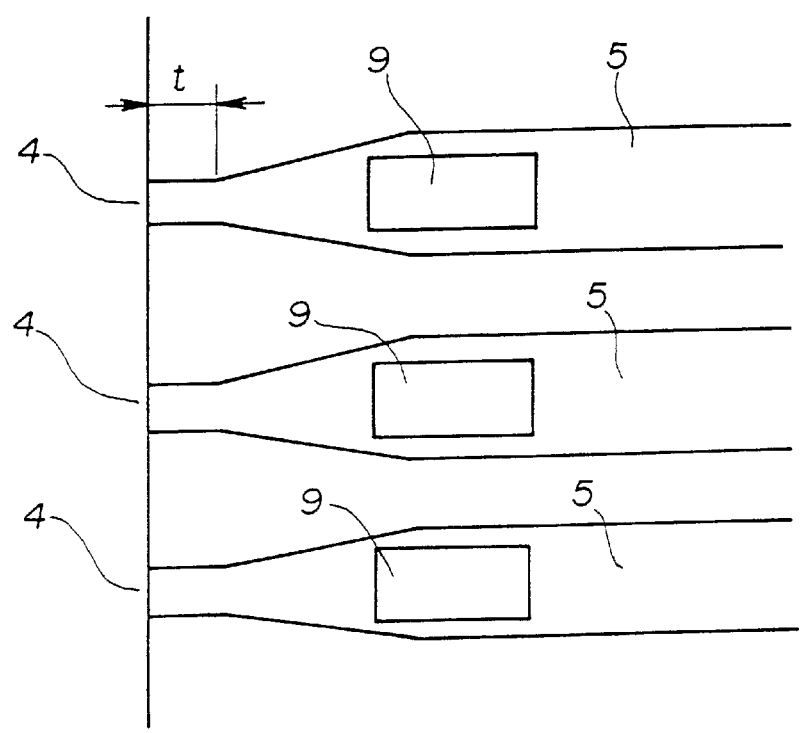

The ink-jet recording head based on thermal energy, which recording head was used in this experiment, is shown in FIG. 3B. FIG. 1A shows that a tip of the ink passageway is the orifice of the nozzle, but the nozzle used in this experiment was covered with the nozzle plate 20 having the same number of the orifices 21 as number of nozzles 4 in FIG. 1A. Although FIGS. 1A and 3B show only four nozzles for simplicity, the actual number of the nozzles used in this experiment was 128, to give 400 dpi resolution. Other conditions for recording were as follows. A size of the heating element was 22 $\mu$m×90 $\mu$m, its resistance value was 110 $\Omega$, a drive voltage of ink ejection was 24 V, a width of a drive pulse was 6.5 $\mu$s, and a drive frequency was 12 kHz. Additionally, recording head H5, H6 and H7 were prepared with orifices having $\phi$25- $\mu$m diameters and three different thicknesses t of the nozzle plate. The thickness, t was a thickness, 40 μm for H5, 50 μm for H6, and 60 μm for H7. As noted above, there are two types of the nozzles in the present invention as shown in FIGS. 1A and 3B. FIGS. 14A and 14B show a sectional schematic view of the two types of the nozzles. FIG. 14A illustrates a case of attachment of the nozzle plate 20. In this case, t is a thickness of the nozzle plate 20. FIG. 14B shows that the orifice is a tip of the ink passageway. In this case, in general, there are a tapered shape and a straight shape at an outlet portion of the ink passageway. As shown in FIG. 14B, the thickness t is a length of the straight part of the orifice having a uniform cross-sectional area at the outlet portion.

The inks used in this experiment can be formed of the following composition and by the following process. Investigation was made using inks with different pigment diameters ranging from 0.005 to 4 μm in combination with the three distinct nozzle thicknesses t of the recording heads H5 to H7. Standing conditions after performing ink ejection for a constant period were standing for 10 hours at a temperature of 40° C. and 30% humidity.

The process for making inks was as follows. Using a solution where styrene / methacrylic acid / ethyl acrylate copolymer P2 having an acid value of 290, the weight-average molecular weight of 5,000 and a glass transition temperature of 77° C. was dissolved by use of monoethanolamine, the following anthraquinone-based Pigment Red-177 dispersions D18 to D39 were made.

| Materials | Parts |
| --- | --- |
| Copolymer P2 (15% by weight) | 40 |
| Pigment Red-177 (manufactured by Ciba-Geigy) | 24 |
| Diethylene glycol | 20 |
| Isopropyl alcohol | 10 |
| Water | 130 |

These materials was added to the batch-type longitudinal sand mill device (manufactured by AIMEX CO., LTD.) filled with glass beads, and a dispersion treatment was continued for 3 hours during water cooling to give a crude dispersion with a viscosity of 30 cp and a pH of 9.8. This dispersion was centrifuged to remove large particles. Varying the conditions for centrifugation provided the dispersions D18 to D39 having an average diameter ranging from 0.005 μm to 4 μm. Dilution of these dispersions with water, diethylene glycol, and ethylene glycol monobutyl ether (60:25:15 by weight) gave red basic ink-jet inks-R1 to R20 with a viscosity of 3 cp, a surface tension of 40 dyn/cm, and a pH of 9.5. A solid content of a final ink was about 7.5% by weight. A final amount of pigment in these inks was about 5% by weight. An average diameter of the pigment was determined by a particle size distribution measurement device (Otsuka Electronics Co., LTD.) using a dynamic light scattering method. The average value was obtained from an initial gradient of an autocorrelation function.

In combinations of these inks R1 to R20 with the recording heads H5 to H7, examination of nozzle clogging occurrence was made to provide the results as shown in Tables 6 to 8.

TABLE 6

In a case of the recording head H5 (t = 40 μm)

| Ink | Pigment diameter Dp(μm) | Dp/t | (Nozzle number subjected to nozzle clogging)/ (total nozzle number) | Judgment |
| --- | --- | --- | --- | --- |
| R1 | 0.005 | 0.000125 | 1) | X |
| R2 | 0.01 | 0.00025 | 1) | X |
| R3 | 0.02 | 0.0005 | 0/128[2] | ◯ |
| R4 | 0.03 | 0.00075 | 0/128 | ◯ |
| R5 | 0.04 | 0.001 | 0/128 | ◯ |
| R6 | 0.05 | 0.00125 | 0/128 | ◯ |
| R7 | 0.06 | 0.0015 | 0/128 | ◯ |
| R8 | 0.07 | 0.00175 | 0/128 | ◯ |
| R9 | 0.08 | 0.002 | 0/128 | ◯ |
| R10 | 0.09 | 0.00225 | 0/128 | ◯ |
| R11 | 0.1 | 0.0025 | 0/128 | ◯ |
| R12 | 0.15 | 0.00375 | 0/128 | ◯ |
| R13 | 0.2 | 0.005 | 0/128 | ◯ |
| R14 | 0.25 | 0.00625 | 0/128 | ◯ |
| R15 | 0.3 | 0.0075 | 0/128 | ◯ |
| R16 | 0.4 | 0.01 | 0/128 | ◯ |
| R17 | 1 | 0.025 | 30/128(partial clogging) | Δ |
| R18 | 2 | 0.05 | 128/128(complete clogging) | X |
| R19 | 3 | 0.075 | 128/128(complete clogging) | X |
| R20 | 4 | 0.1 | 128/128(complete clogging) | X |

[1] No evaluation was performed due to ink instability.
[2] A slight instability of the ink was observed.

TABLE 7

In a case of the recording head H6 (t = 50 μm)

| Ink | Pigment diameter Dp(μm) | Dp/t | (Nozzle number subjected to nozzle clogging)/ (total nozzle number) | Judgment |
| --- | --- | --- | --- | --- |
| R1 | 0.005 | 0.0001 | 1) | X |
| R2 | 0.01 | 0.0002 | 1) | X |
| R3 | 0.02 | 0.0004 | 0/128[2] | ◯ |
| R4 | 0.03 | 0.0006 | 0/128 | ◯ |
| R5 | 0.04 | 0.0008 | 0/128 | ◯ |
| R6 | 0.05 | 0.001 | 0/128 | ◯ |
| R7 | 0.06 | 0.0012 | 0/128 | ◯ |
| R8 | 0.07 | 0.0014 | 0/128 | ◯ |
| R9 | 0.08 | 0.0016 | 0/128 | ◯ |
| R10 | 0.09 | 0.0018 | 0/128 | ◯ |
| R11 | 0.1 | 0.002 | 0/128 | ◯ |
| R12 | 0.15 | 0.003 | 0/128 | ◯ |
| R13 | 0.2 | 0.004 | 0/128 | ◯ |
| R14 | 0.25 | 0.005 | 0/128 | ◯ |
| R15 | 0.3 | 0.006 | 0/128 | ◯ |
| R16 | 0.4 | 0.008 | 0/128 | ◯ |
| R17 | 1 | 0.02 | 36/128(partial clogging) | Δ |
| R18 | 2 | 0.04 | 128/128(complete clogging) | X |
| R19 | 3 | 0.06 | 128/128(complete clogging) | X |
| R20 | 4 | 0.08 | 128/128(complete clogging) | X |

[1] No evaluation was performed due to ink instability.
[2] A slight instability of the ink was observed.

TABLE 8

In a case of the recording head H7 (t = 60 μm)

| Ink | Pigment diameter Dp(μm) | Dp/t | (Nozzle number subjected to nozzle clogging)/ (total nozzle number) | Judgment |
| --- | --- | --- | --- | --- |
| R1 | 0.005 | 0.000083 | 1) | X |
| R2 | 0.01 | 0.000167 | 1) | X |
| R3 | 0.02 | 0.00033 | 0/128[2] | ◯ |
| R4 | 0.03 | 0.0005 | 0/128 | ◯ |
| R5 | 0.04 | 0.00067 | 0/128 | ◯ |
| R6 | 0.05 | 0.000833 | 0/128 | ◯ |

TABLE 8-continued

In a case of the recording head H7 (t = 60 μm)

| Ink | Pigment diameter Dp(μm) | Dp/t | (Nozzle number subjected to nozzle clogging)/ (total nozzle number) | Judgment |
|---|---|---|---|---|
| R7 | 0.06 | 0.001 | 0/128 | ○ |
| R8 | 0.07 | 0.001167 | 0/128 | ○ |
| R9 | 0.08 | 0.00133 | 0/128 | ○ |
| R10 | 0.09 | 0.0015 | 0/128 | ○ |
| R11 | 0.1 | 0.00167 | 0/128 | ○ |
| R12 | 0.15 | 0.0025 | 0/128 | ○ |
| R13 | 0.2 | 0.0033 | 0/128 | ○ |
| R14 | 0.25 | 0.004167 | 0/128 | ○ |
| R15 | 0.3 | 0.005 | 0/128 | ○ |
| R16 | 0.4 | 0.0067 | 0/128 | ○ |
| R17 | 1 | 0.0167 | 48/128(partial clogging) | Δ |
| R18 | 2 | 0.033 | 128/128(complete clogging) | X |
| R19 | 3 | 0.05 | 128/128(complete clogging) | X |
| R20 | 4 | 0.067 | 128/128(complete clogging) | X |

1) No evaluation was performed due to ink instability.
2) A slight instability of the ink was observed.

From these results, a stable ink droplet ejection in the absence of nozzle clogging was accomplished when the pigment diameter $D_p$ and the nozzle thickness t satisfied a relationship $D_p/t \leq 0.01$.

Another feature of the present Invention will be described as follows. As noted above, the color agent in the recording liquid is not dye which is dissolved in water or the like but pigment which is dispersed in water or the like. From the foregoing results, it was discovered that no nozzle clogging takes place within the range of the above relationship between the pigment diameter and nozzle thickness. Furthermore, it Is necessary to deposit ink droplets onto a desired surface of the record receiving member with high accuracy as well as to eject ink droplets stably, when the ink ejection is performed using pigment-based inks.

To study the relation between the nozzle thickness t associated with nozzle clogging and a distance L between a nozzle plane and a receiver medium, such as paper, the following experiment was carried out by use of the above-mentioned H5 to H7 which have an orifice diameter of ϕ25 μm and a nozzle number of 128 to give 400 dpi resolution. A size of the heating element was 22 μm×90 μm, its resistance value was 110 Ω, a drive voltage of ink ejection was 24 V, a width of a drive pulse was 6.5 μs and a drive frequency was 12 kHz. Using the above red basic R5 as an ink-Jet ink and a matted coat NM (manufactured by Mitsubishi Paper Mills) as a receiving member, a printing experiment was performed using distances L between the nozzle plate of the recording head and the receiving medium. An evaluation as to whether a high-quality recording (a high dot positional precision) was achieved was made by Ad examination of a pixel positional precision on a surface of the receiving medium. In a case in which the present apparatus employed the small nozzle and the pigment-based ink-jet ink, so that it was difficult to eject ink droplets accurately as compared to a conventional apparatus, two ejection directions was evaluated in this experiment, so as to take into the consideration the effect of gravity on ejection characteristics. That is, the ink was ejected both in a horizontal direction and vertical direction. The results are shown in Table 9.

TABLE 9

| Distance L (mm) | Head H5 (t = 40 μm) | | | Head H6 (t = 50 μm) | | | Head H7 (t = 60 μm) | | |
|---|---|---|---|---|---|---|---|---|---|
| | | H[1] | V[2] | | H[1] | V[2] | | H[1] | V[2] |
| 0.1 | 2.5 t | — | — | 2 t | — | — | 1.7 t | — | — |
| 0.5 | 12.5 t | ○ | ○ | 10 t | ○ | ○ | 8.3 t | ○ | ○ |
| 1 | 25 t | ○ | ○ | 20 t | ○ | ○ | 16.7 t | ○ | ○ |
| 1.5 | 37.5 t | ○ | ○ | 30 t | ○ | ○ | 25 t | ○ | ○ |
| 2 | 50 t | ○ | ○ | 40 t | ○ | ○ | 33.3 t | ○ | ○ |
| 2.5 | 62.5 t | ○ | ○ | 50 t | ○ | ○ | 41.7 t | ○ | ○ |
| 3 | 75 t | ○ | ○ | 60 t | ○ | ○ | 50 t | ○ | ○ |
| 3.5 | 87.5 t | ○ | ○ | 70 t | ○ | ○ | 58.3 t | ○ | ○ |
| 4 | 100 t | Δ | ○ | 80 t | ○ | ○ | 66.7 t | ○ | ○ |
| 4.5 | 112.5 t | X | ○ | 90 t | ○ | ○ | 75 t | ○ | ○ |
| 5 | 125 t | X | X | 100 t | Δ | ○ | 83.3 t | ○ | ○ |
| 5.5 | 137.5 t | X | X | 110 t | X | ○ | 91.7 t | ○ | ○ |
| 6 | 150 t | X | X | 120 t | X | X | 100 t | Δ | ○ |
| 6.5 | 162.5 t | X | X | 130 t | X | X | 108.3 t | X | ○ |
| 7 | 175 t | X | X | 140 t | X | X | 125 t | X | X |
| 8 | 200 t | X | X | 160 t | X | X | 133.3 t | X | X |

H[1] represents a horizontal direction.
V[2] represents a vertical direction.

In Table 9, mark ○ indicates that a gap between a printed dot position and a desired dot position is less than a quarter dot, mark Δ indicates that the gap is more than a quarter dot and less than a half dot, and mark X indicates that the gap is more than a half dot. A size of the dot was approximately 60 μm diameter. From the results, even the present apparatus which has the small nozzle and has difficulty in ejecting droplets as compared to the conventional apparatus can eject ink droplets stably to produce a high quality recording image with a high dot positional precision under conditions that the distance L between the nozzle plane and the surface of the receiving member is less than 100t. Especially, it is preferred that the ejection direction be vertical to avoid a recording position change due to gravity. The present invention is not necessarily limited by using a completely vertical direction of droplet ejection, and is still effective under a slight influence of gravity. When using the present invention, it is advantageous to eject droplets in a downward direction in a case of an absence of a completely vertical ejection direction due to a structural restriction of the printer.

Next, another feature of the present invention will be described as follows. As noted above, the present invention relates to the ink-jet recording method wherein an ink droplet can be ejected from the small orifice, and problems, such as damage and wear of the nozzle caused by the pigments in the ink must be solved, because these problem have significant influences on ink drop ejection characteristics.

Recently, as mentioned above, to obtain a high-quality and high-resolution ink-jet image, a smaller nozzle has been required for this purpose, although a conventional nozzle diameter from ϕ33~ϕ34 μm (about 900 μm$^2$ in terms of cross-sectional area of the nozzle orifice) to ϕ50~ϕ51 μm (about 2000 μm$^2$ in terms of cross-sectional area of the nozzle orifice) in the recording head has been used. In this case, although the previous relatively large nozzle is subjected to slight damage and wear, there is little influence on ink drop ejection characteristics, such as ejection stability, ink weight uniformity and the like, thereby causing the damage and wear to be almost negligible for the size of nozzle. However in a case of the smaller nozzle having, for example, a less than ϕ25- μm diameter, even slight damage and wear of the nozzle have a significant influence on ink drop ejection characteristics, such as ejection stability and ink weight uniformity and the like.

In the present invention, it was considered that the damage and wear of the nozzle may be prevented by the suitable choice of a hardness of materials constituting a nozzle part. The following experiment focuses on a relation between the hardness of nozzle materials and damage and wear of the nozzle. More specifically, the nozzle plates of the recording head shown in FIG. 3A were made with various material hardnesses. Evaluation as to whether nozzle damage and wear occurred and whether deterioration of ink droplet ejection characteristics occurred was performed. The ink-jet recording head based on thermal energy, which recording head was used in this experiment, is shown in FIG. 3B. Although FIG. 3B shows only four nozzles for simplicity, the actual number of nozzles used in this experiment was 128, thereby giving 400 dpi resolution. Other conditions for recording were as follows. A size of the heating element was 22 μm×90 μm, its resistance value was 110 Ω, a drive voltage of ink ejection was 24 V, a width of a drive pulse was 6.5 μs, and a drive frequency was 12 kHz. Additionally, various nozzle parts were prepared by changing resins and metallic materials for the nozzle plate. The orifice diameters of φ25 μm (H8) and φ20 μm (H9) were used in this experiment.

A comparative experiment was made with the orifice diameter of φ50 μm (reference head). In this case, number of nozzles used was 48, thereby giving 180 dpi resolution. A size of a heating element for this nozzle was 40 μm×180 μm, its resistance value was 120 Ω, a drive voltage for ink ejection was 30 V, a width of a drive pulse was 7 μs, and a drive frequency was 1.8 kHz. A thickness of each nozzle plate was 40 μm. The hardness of various materials for the nozzle plate was evaluated by a Rockwell hardness. An actual hardness was measured with a test piece similar to materials which form the nozzle plate. Table 10 shows the results of the hardness of materials. The hardness is mainly expressed by a Rockwell M scale, but some metallic materials are expressed by a Rockwell B scale. (The B scale is applied to harder materials than that exhibiting M scale hardness.)

TABLE 10

| Sample | Name of Materials | Rockwell Hardness |
|---|---|---|
| S1 | Silicone resin(filled with glass fiber) | M45 |
| S2 | Vinylidene chloride resin | M50 |
| S3 | Polystyrene resin | M65 |
| S4 | Polysulfone resin | M69 |
| S5 | Polycarbonate resin | M70 |
| S6 | Acrylonitrile-styrene copolymer | M80 |
| S7 | Polymethyl methacrylate resin | M90 |
| S8 | Allylic resin | M95 |
| S9 | High-temperature cure-type epoxy resin (curing agent: acid anhydrides) | M100 |
| S10 | High-temperature cure-type epoxy resin (curing agent: aromatic amines) | M108 |
| S11 | Urea resin(filled with α-cellulose) | M120 |
| S12 | Aluminum | M65 |
| S13 | Nickel | B70[1)] |
| S14 | Stainless (SUS304) | B95[1)] |

[1)]The B scale is higher than M140.

The ink used in this experiment was formed of the following composition and by the following process. Examination was made using inks with different pigment diameters ranging from 0.02 μm to 1 μm in combination with different diameters and different materials of the nozzle in the recording head.

The process for making the inks was as follows. Using a solution where styrene / acrylic acid / butyl methacrylate copolymer P3 having an acid value of 265, the weight-average molecular weight of 8,000 and a glass transition temperature of 67° C. was dissolved by use of monoethanolamine, the following pigment red 122 dispersions D40 to D46 were made.

| Materials | Parts |
|---|---|
| Copolymer P3(15% by weight) | 40 |
| Pigment Red 122 (Fastgen-Hermagenta RT manufactured by Dainippon Ink Chemical) | 24 |
| Diethylene glycol | 20 |
| Isopropyl alcohol | 10 |
| Water | 130 |

These materials was added to the batch-type longitudinal sand mill device (manufactured by AIMEX Co., LTD.) filled with glass beads, and a dispersion treatment was continued for 3 hours during water cooling to give a crude dispersion with a viscosity of 18 cp and a pH of 9.5. This dispersion was centrifuged to remove large particles. Varying the conditions for centrifugation provided the dispersions D40 to D46 having an average diameter ranging from 0.02 μm to 1 μm. Dilution of these dispersions with water, diethylene glycol and ethylene glycol monobutyl ether (60:30:10 by weight) gave magenta basic ink-jet inks M1 to M7 with a viscosity of 3.3 cp, a surface tension of 35 dyn/cm, and a pH of 9.3. A solid content of a final ink was about 7.5% by weight. A final content of the pigment in these inks was 5% by weight. An average pigment diameter was determined by a particle size distribution measurement device (Otsuka Electronics Co., LTD.) using a dynamic light scattering method. The average was obtained from an initial gradient of an autocorrelation function.

In combinations of these inks M1 to M7 with the above different diameters and different materials of the nozzles, all 128 nozzles ejected ink drops so that each nozzle could emit 5×10$^8$ drops. Evaluation for nozzle damage and wear between initial and final states of ink droplet ejection was made to study deterioration of ink ejection characteristics. The results are tabulated in Tables 11, 12, and 13. In these tables, mark ○ indicates no observation of nozzle damage and wear and no deterioration of ink ejection characteristics, mark Δ indicates slight nozzle damage and wear, but no deterioration of ink ejection characteristics, and mark X indicates that the nozzle was damaged and worn and that ink ejection characteristics were deteriorated.

TABLE 11

In a case of H8 (orifice diameter was φ 25 μm)

| Sample No. | M1 ink Pigment diameter 0.02 μm | M2 ink Pigment diameter 0.05 μm | M3 ink Pigment diameter 0.1 μm | M4 ink Pigment diameter 0.2 μm | M5 ink Pigment diameter 0.4 μm | M6 ink Pigment diameter 0.6 μm | M7 ink Pigment diameter 1 μm |
|---|---|---|---|---|---|---|---|
| S1 | ○ | X | X | X | X | X | X |
| S2 | ○ | X | X | X | X | X | X |
| S3 | ○ | ○ | ○ | ○ | X | X | X |
| S4 | ○ | ○ | ○ | ○ | X | X | X |
| S5 | ○ | ○ | ○ | ○ | X | X | X |
| S6 | ○ | ○ | ○ | ○ | X | X | X |
| S7 | ○ | ○ | ○ | ○ | X | X | X |
| S8 | ○ | ○ | ○ | ○ | X | X | X |
| S9 | ○ | ○ | ○ | ○ | X | X | X |
| S10 | ○ | ○ | ○ | ○ | X | X | X |
| S11 | ○ | ○ | ○ | ○ | X | X | X |

TABLE 11-continued

In a case of H8 (orifice diameter was φ 25 μm)

| Sample No. | M1 ink Pigment diameter 0.02 μm | M2 ink Pigment diameter 0.05 μm | M3 ink Pigment diameter 0.1 μm | M4 ink Pigment diameter 0.2 μm | M5 ink Pigment diameter 0.4 μm | M6 ink Pigment diameter 0.6 μm | M7 ink Pigment diameter 1 μm |
|---|---|---|---|---|---|---|---|
| S12 | ○ | ○ | ○ | ○ | X | X | X |
| S13 | ○ | ○ | ○ | ○ | ○ | ○ | X |
| S14 | ○ | ○ | ○ | ○ | ○ | ○ | X |

TABLE 12

In a case of H9 (orifice diameter was φ 20 μm)

| Sample No. | M1 ink Pigment diameter 0.02 μm | M2 ink Pigment diameter 0.05 μm | M3 ink Pigment diameter 0.1 μm | M4 ink Pigment diameter 0.2 μm | M5 ink Pigment diameter 0.4 μm | M6 ink Pigment diameter 0.6 μm | M7 ink Pigment diameter 1 μm |
|---|---|---|---|---|---|---|---|
| S1 | ○ | X | X | X | X | X | X |
| S2 | ○ | X | X | X | X | X | X |
| S3 | ○ | ○ | ○ | ○ | X | X | X |
| S4 | ○ | ○ | ○ | ○ | X | X | X |
| S5 | ○ | ○ | ○ | ○ | X | X | X |
| S6 | ○ | ○ | ○ | ○ | X | X | X |
| S7 | ○ | ○ | ○ | ○ | X | X | X |
| S8 | ○ | ○ | ○ | ○ | X | X | X |
| S9 | ○ | ○ | ○ | ○ | X | X | X |
| S10 | ○ | ○ | ○ | ○ | X | X | X |
| S11 | ○ | ○ | ○ | ○ | X | X | X |
| S12 | ○ | ○ | ○ | ○ | X | X | X |
| S13 | ○ | ○ | ○ | ○ | ○ | ○ | X |
| S14 | ○ | ○ | ○ | ○ | ○ | ○ | X |

TABLE 13

Comparative reference (orifice diameter was φ 50 μm)

| Sample No. | M1 ink Pigment diameter 0.02 μm | M2 ink Pigment diameter 0.05 μm | M3 ink Pigment diameter 0.1 μm | M4 ink Pigment diameter 0.2 μm | M5 ink Pigment diameter 0.4 μm | M6 ink Pigment diameter 0.6 μm | M7 ink Pigment diameter 1 μm |
|---|---|---|---|---|---|---|---|
| S1 | ○ | X | X | X | X | X | X |
| S2 | ○ | X | X | X | X | X | X |
| S3 | ○ | ○ | ○ | ○ | Δ | Δ | Δ |
| S4 | ○ | ○ | ○ | ○ | Δ | Δ | Δ |
| S5 | ○ | ○ | ○ | ○ | Δ | Δ | Δ |
| S6 | ○ | ○ | ○ | ○ | Δ | Δ | Δ |
| S7 | ○ | ○ | ○ | ○ | Δ | Δ | Δ |
| S8 | ○ | ○ | ○ | ○ | Δ | Δ | Δ |
| S9 | ○ | ○ | ○ | ○ | Δ | Δ | Δ |
| S10 | ○ | ○ | ○ | ○ | Δ | Δ | Δ |
| S11 | ○ | ○ | ○ | ○ | Δ | Δ | Δ |
| S12 | ○ | ○ | ○ | ○ | Δ | Δ | Δ |
| S13 | ○ | ○ | ○ | ○ | ○ | ○ | Δ |
| S14 | ○ | ○ | ○ | ○ | ○ | ○ | Δ |

From the results, it is understood that even though the recording head with the large orifice diameter is subjected to slight damage and wear, deterioration of ink ejection characteristics is unlikely to occur. In the case of the small nozzle orifice diameter of less than φ25 μm in the present invention, it is understood that the requirement of the absence of nozzle damage and wear must be selected to eject ink droplets stably, since the nozzle damage and wear cause ink droplet characteristics to be deteriorated. When a form of the orifice is rectangular and trapezoidal instead of the round orifice, the results are the same as for the present invention. In this case, the orifice diameter of less than φ25 μm corresponds to the orifice cross-sectional area of about 500 μm² and the present invention can be applied to the recording head having the orifice cross-sectional area of less than about 500 μm² instead of the round orifice.

More specifically, from Tables 11 and 12, the nozzle portion must be formed of resin materials which have a hardness of Rockwell M65 to M120 in order to prevent nozzle damage and wear problems when using the ink having the pigment diameter ranging from 0.02 μm to 0.2 μm. However, nozzle damage and wear is unlikely to occur when using the ink having the pigment diameter of 0.02 μm in combination with the nozzle portion formed of materials which have a hardness of less than Rockwell M65, thereby causing the absence of deterioration of ink ejection characteristics, but this is impractical because the ink used can be limited by the nozzle hardness.

Although the above discussions are described with regard to the bubble-jet recording method, the present invention is not limited to this method. The present invention can be applied to all ink-jet recording methods which employ a small nozzle orifice and pigment-based ink. Furthermore, it goes without saying that the present invention is applicable to multicolor ink-jet recording, although the above examples are described with use of a single ink.

The present invention is not limited to the specifically disclosed embodiments, and variations and modifications may be made without departing from scope of the present invention.

The present application is based on Japanese priority application Nos. 10-205195 filed on Jul. 21, 1998, 10-327734 filed on Nov. 18, 1998, and 11-104494 filed on Apr. 12, 1999, the entire contents of which are hereby incorporated by reference.

What is claimed is:

1. A liquid jet recording apparatus for ejecting a recording composition from orifices toward a receiving medium so as to accomplish a recording, said recording composition formed by dispersing fine particles, wherein:

said orifices have a diameter equal to or less than 25 μm; and each of said fine particles has a size $D_p$ determined by a relationship $$0.001 \leq D_p / D_o \leq 0.01$$

wherein $D_o$ represents a diameter of said orifices.

2. The apparatus as claimed in claim 1, wherein said recording composition comprises a plurality of color recording compositions, each of said color recording compositions including said dispersed fine particles corresponding to a respective color, the plurality of color recording compositions being ejectable from each of said orifices corresponding to the respective color.

3. The apparatus as claimed in claim 2, further comprising a plurality of recording heads which eject the plurality of color recording compositions and form a head unit.

4. The apparatus as claimed in claim 3, wherein said head unit includes a nozzle part and a recording liquid reservoir part integrally formed with the nozzle part.

5. The apparatus as claimed in claim 3, wherein said head unit includes a nozzle part and a recording liquid reservoir part separable from the nozzle part.

6. The apparatus as claimed in claim 5, wherein said recording liquid reservoir part is separable according to a kind of the recording composition.

7. A liquid jet recording apparatus for ejecting a recording composition from orifices toward a receiving medium so as to accomplish a recording, said recording composition formed by dispersing fine particles, wherein:

said orifices have a diameter equal to or less than 25 μm; and a content of said fine particles in said recording composition is in the range of 2 to 10% by weight and a solid content of said recording composition including said fine particles is less than 15% by weight.

8. The apparatus as claimed in claim 7, wherein said recording composition comprises a plurality of color recording compositions, each of said color recording compositions including said dispersed fine particles corresponding to a respective color, the plurality of color recording compositions being ejectable from each of said orifices corresponding to the respective color.

9. The apparatus as claimed in claim 8, further comprising a plurality of recording heads which eject the plurality of color recording compositions and form a head unit.

10. The apparatus as claimed in claim 9, wherein said head unit includes a nozzle part and a recording liquid reservoir part integrally formed with the nozzle part.

11. The apparatus as claimed in claim 9, wherein said head unit includes a nozzle part and a recording liquid reservoir part separable from the nozzle part.

12. The apparatus as claimed in claim 11, wherein said recording liquid reservoir part is separable according to a kind of the recording composition.

13. A liquid jet recording apparatus for ejecting a recording composition from orifices toward a receiving medium so as to accomplish a recording, fine particles having a size $D_p$ being dispersed in said recording composition, each of said orifices being a tip of liquid passageway, wherein:

said orifices have a diameter equal to or less than 25 μm; and $D_p$ is determined by a relationship:

$$D_p/t \leq 0.01$$

wherein t is a length of said orifices having a uniform cross-sectional area at an outlet portion.

14. The apparatus as claimed in claim 13, further comprising a nozzle plate having second orifices communicating with liquid passageways.

15. The apparatus as claimed in claim 13, wherein a distance between said orifices and a surface of the receiving medium is equal to or less than 100t, and said recording composition is ejected from said orifices in a direction of gravity approximately.

16. The apparatus as claimed in claim 13, further comprising a plurality of recording heads which eject the plurality of color recording compositions and form a head unit.

17. The apparatus as claimed in claim 16, wherein said head unit includes a nozzle part and a recording liquid reservoir part integrally formed with the nozzle part.

18. The apparatus as claimed in claim 16, wherein said head unit includes a nozzle part and a recording liquid reservoir part separable from the nozzle part.

19. The apparatus as claimed in claim 18, wherein said recording liquid reservoir part is separable according to a kind of the recording composition.

20. A liquid jet recording apparatus for ejecting a recording composition from orifices toward a receiving medium so as to accomplish a recording, said recording composition formed by dispersing fine particles, wherein:

said orifices are formed of resin material and have a diameter equal to or less than 25 μm; and said resin material has a hardness of Rockwell M65 to M120.

21. The apparatus as claimed in claim 20, wherein each of said fine particles is a pigment having a diameter ranging from 0.02 μm to 0.2 μm.

22. The apparatus as claimed in claim 20, further comprising a plurality of recording heads which eject the plurality of color recording compositions and form a head unit.

23. The apparatus as claimed in claim 22, wherein said head unit includes a nozzle part and a recording liquid reservoir part integrally formed with the nozzle part.

24. The apparatus as claimed in claim 22, wherein said head unit Includes a nozzle part and a recording liquid reservoir part separable from the nozzle part.

25. The apparatus as claimed in claim 24, wherein said recording liquid reservoir part is separable according to a kind of the recording composition.

* * * * *